United States Patent
Niizeki

(10) Patent No.: US 12,485,891 B2
(45) Date of Patent: Dec. 2, 2025

(54) DRIVING ASSISTANCE APPARATUS, VEHICLE, AND NON-TRANSITORY RECORDING MEDIUM

(71) Applicant: SUBARU CORPORATION, Tokyo (JP)

(72) Inventor: Yui Niizeki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 161 days.

(21) Appl. No.: 18/466,193

(22) Filed: Sep. 13, 2023

(65) Prior Publication Data

US 2024/0092360 A1    Mar. 21, 2024

(30) Foreign Application Priority Data

Sep. 20, 2022 (JP) .................... 2022-148793

(51) Int. Cl.
*B60W 30/095* (2012.01)
*G06V 20/58* (2022.01)

(52) U.S. Cl.
CPC ......... *B60W 30/0956* (2013.01); *G06V 20/58* (2022.01); *B60W 2420/403* (2013.01); *B60W 2554/4041* (2020.02)

(58) Field of Classification Search
CPC ....... B60W 30/0956; B60W 2420/403; B60W 2554/4041; G06V 20/58
See application file for complete search history.

(56) References Cited

U.S. PATENT DOCUMENTS

| | | | |
|---|---|---|---|
| 2016/0176399 A1* | 6/2016 | Takagi | B60W 30/18154 701/301 |
| 2017/0327094 A1* | 11/2017 | Inoue | B60W 30/09 |
| 2022/0315051 A1* | 10/2022 | Patel | B60W 40/04 |
| 2023/0015466 A1* | 1/2023 | Jiralerspong | G01C 21/3407 |

FOREIGN PATENT DOCUMENTS

JP    2017-206039 A    11/2017

* cited by examiner

*Primary Examiner* — Ig T An
(74) *Attorney, Agent, or Firm* — Rimon P.C.

(57) ABSTRACT

A driving assistance apparatus assists in driving of a vehicle. The driving assistance apparatus includes one or more processors and one or more memories communicably coupled to the one or more processors. The one or more processors execute: a blind spot region detection process of detecting a blind spot region as viewed from the vehicle formed by a blind spot forming object, based on data regarding a surrounding environment of the vehicle; a mobile body detection process of detecting a mobile body that has entered the blind spot region from outside the blind spot region, based on the data regarding the surrounding environment of the vehicle; and a contact risk estimation process of estimating a risk of contact between the vehicle and the mobile body, based on a movement direction and a movement speed of the mobile body, and a temporal change in the blind spot region.

11 Claims, 11 Drawing Sheets

DRIVING ASSISTANCE APPARATUS, VEHICLE, AND NON-TRANSITORY RECORDING MEDIUM

CROSS-REFERENCE TO RELATED APPLICATIONS

The present application claims priority from Japanese Patent Application No. 2022-148793 filed on Sep. 20, 2022, the entire contents of which are hereby incorporated by reference.

BACKGROUND

The disclosure relates to a driving assistance apparatus, a vehicle, and a non-transitory recording medium.

Recently, the practical application of vehicles equipped with a driving assistance function and an automatic driving function, including autonomous emergency braking (AEB) and adaptive cruise control (ACC), has been promoted mainly for the purpose of reduction in traffic accidents and reduction in a burden of driving. For example, apparatuses have been known that detect an obstacle present around a vehicle based on data detected by various sensors and assist in driving the vehicle, to avoid contact between the vehicle and the obstacle. The various sensors are, for example, a vehicle outside capturing camera, a light detection and ranging (LiDAR), and a radar sensor provided in the vehicle. However, in some traffic accidents, there are events that are difficult to avoid unless a preparatory action such as deceleration is taken assuming an accident in advance, e.g., a sudden rush out of a blind spot region.

In view of such circumstances, for example, Japanese Unexamined Patent Application Publication (JP-A) No. 2017-206039 discloses a technique of anticipating and avoiding a latent risk not detectable by a vehicle, such as a sudden rush out of a blind spot region, in consideration of occurrence of the latent risk on a route planned to be traveled by the vehicle. For example, JP-A No. 2017-206039 discloses a driving assistance apparatus that starts automatic deceleration control when a driver's braking operation or steering operation is detected or when a predetermined time elapses, after a blind spot region as viewed from the vehicle in a traveling direction of the vehicle is detected. JP-A No. 2017-206039 also discloses presenting the driver with information indicating a risk of a pedestrian or a bicycle rushing out of the blind spot region when the blind spot region is detected.

SUMMARY

An aspect of the disclosure provides a driving assistance apparatus configured to assist in driving of a vehicle. The driving assistance apparatus includes one or more processors and one or more memories communicably coupled to the one or more processors. The one or more processors are configured to execute: a blind spot region detection process of detecting a blind spot region as viewed from the vehicle formed by a blind spot forming object, based on data regarding a surrounding environment of the vehicle; a mobile body detection process of detecting a mobile body that has entered the blind spot region from outside the blind spot region, based on the data regarding the surrounding environment of the vehicle; and a contact risk estimation process of estimating a risk of contact between the vehicle and the mobile body, based on a movement direction and a movement speed of the mobile body, and a temporal change in the blind spot region.

An aspect of the disclosure provides a vehicle including the above-described driving assistance apparatus.

An aspect of the disclosure provides a non-transitory computer readable recording medium containing a computer program to be applied to a driving assistance apparatus. The driving assistance apparatus is configured to assist in driving of a vehicle. The computer program causes, when executed by one or more processors, the one or more processors to implement a method. The method includes: detecting a blind spot region as viewed from the vehicle formed by a blind spot forming object, based on data regarding a surrounding environment of the vehicle; detecting a mobile body that has entered the blind spot region from outside the blind spot region, based on the data regarding the surrounding environment of the vehicle; and estimating a risk of contact between the vehicle and the mobile body, based on a movement direction and a movement speed of the mobile body, and a temporal change in the blind spot region.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
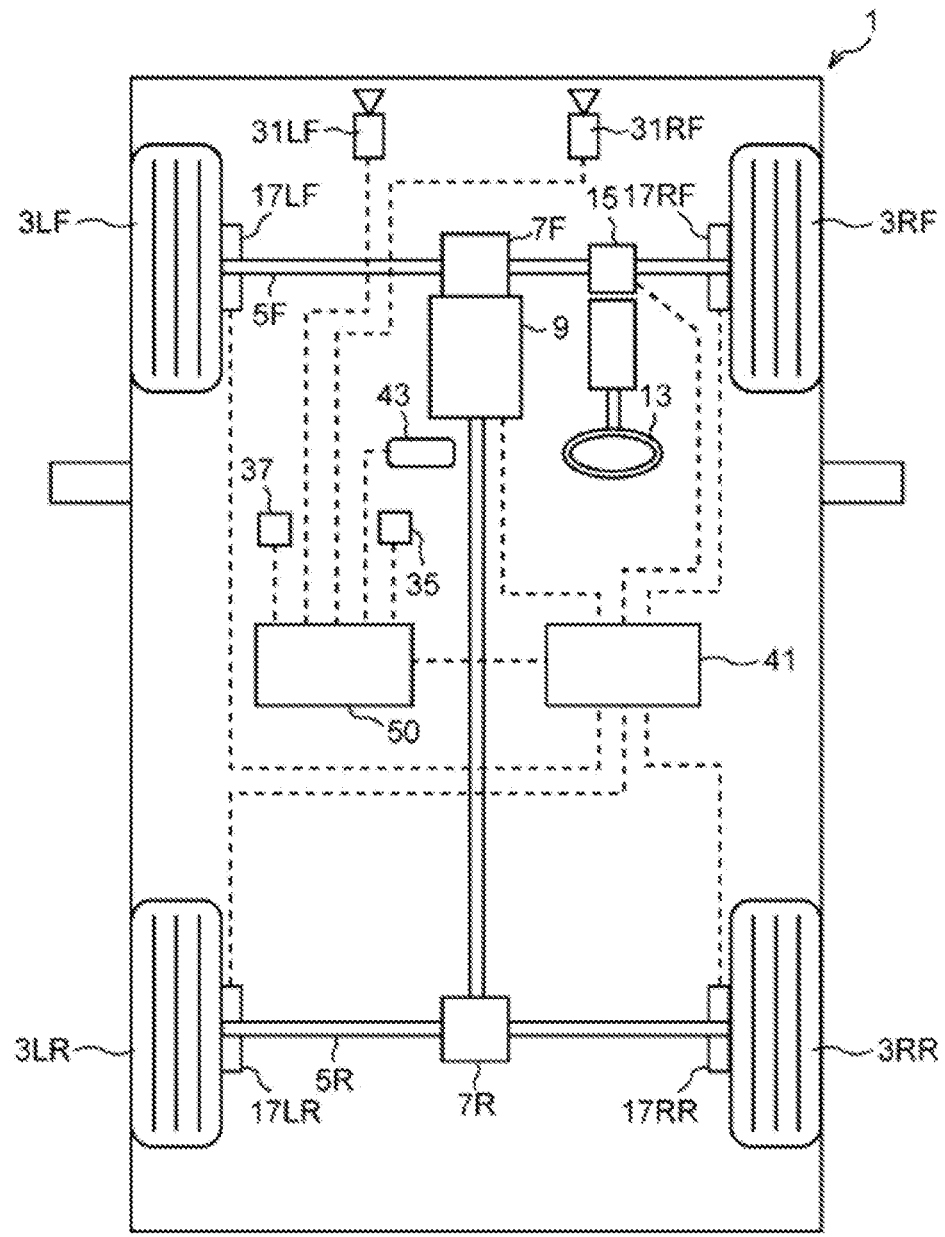
FIG. 1 is a schematic diagram illustrating a configuration example of a vehicle including a driving assistance apparatus according to one example embodiment the disclosure.

Assumed is a situation in which a mobile body visually recognized from an own vehicle enters a blind spot region.

In this case, calculating a movement direction and a movement speed of the mobile body in the visually recognized situation makes it possible to estimate a time and a position at which the mobile body comes out of the blind spot region. The blind spot region as viewed from the own vehicle decreases as the own vehicle travels in such a situation. Thus, until the mobile body appears from the blind spot region, the movement direction and the movement speed of the mobile body may be estimated based on the blind spot region that changes in accordance with traveling of the own vehicle. This makes it is possible to increase prediction accuracy of an entry position and an entry speed of the mobile body onto a path of the own vehicle.

It is desirable to provide a driving assistance apparatus, a vehicle, and a non-transitory recording medium containing a computer program that make it possible to accurately estimate a risk of contact between the own vehicle and a mobile body that enters a blind spot region from outside the blind spot region, based on a movement direction and a movement speed of the mobile body that enters the blind spot region from outside the blind spot region, and a temporal change in the detected blind spot region.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Example Features of Embodiments of Disclosure (1-1) A driving assistance apparatus according to an embodiment of the disclosure is configured to assist in driving of a vehicle. The driving assistance apparatus includes:
one or more processors; and
one or more memories communicably coupled to the one or more processors.
The one or more processors are configured to execute
a blind spot region detection process of detecting a blind spot region as viewed from the vehicle formed by a blind spot forming object, based on data regarding a surrounding environment of the vehicle,
a mobile body detection process of detecting a mobile body that has entered the blind spot region from outside the blind spot region, based on the data regarding the surrounding environment of the vehicle, and
a contact risk estimation process of estimating a risk of contact between the vehicle and the mobile body, based on a movement direction and a movement speed of the mobile body, and a temporal change in the blind spot region.

Note that embodiments of the disclosure may be implemented by the driving assistance apparatus to be mounted on the vehicle to execute the processes described above, and also by a vehicle including the driving assistance apparatus, a computer program for execution of the processes described above, a non-transitory recording medium containing the computer program, or a driving assistance method that executes the processes described above.

With the configuration described above, the driving assistance apparatus, the vehicle, the computer program, the non-transitory recording medium, or the driving assistance method according to any embodiment of the disclosure is able to narrow and estimate an entry position and an entry speed at which the mobile body can enter onto a path of the own vehicle from the blind spot region, based on the movement direction and the movement speed of the mobile body that has entered the blind spot region from outside the blind spot region, and the temporal change in the blind spot region. Consequently, the driving assistance apparatus, the vehicle, the computer program, the non-transitory recording medium, or the driving assistance method according to any embodiment of the disclosure makes it possible to increase prediction accuracy of the risk of contact between the own vehicle and the mobile body that can rush out of the blind spot region.

The "blind spot forming object" may be an object that blocks sight of the own vehicle, and examples thereof may include various three-dimensional objects including another vehicle, a building, a tree, and a hedge.

The "blind spot region" may refer to a region where the sight of the own vehicle is blocked by the blind spot forming object. A "blind spot resolved region" may refer to a region, of the blind spot region identified upon detection of the blind spot forming object, that enters the sight with elapse of time after the detection. A "cumulative blind spot region" may refer to a region continuously kept as the blind spot region, excluding the blind spot resolved region, of the blind spot region identified upon detection of the blind spot forming object.

Examples of the "mobile body" may include various objects that move, including another vehicle, a bicycle, a motorcycle, and a pedestrian.

The "risk of contact" may refer to a possibility of the own vehicle coming into contact with a mobile body. The "risk of contact" may be indicated simply by whether there is the possibility of contact, or may be indicated by, for example, a value, a level, etc. When the "risk of contact" is indicated by a value, a level, etc., a high "risk of contact" may indicate that the own vehicle is highly likely to come into contact with the mobile body.

Of the "risk of contact", an "apparent risk" may refer to a risk of contact between the own vehicle and an obstacle, such as a mobile body or a stationary object, detected by the own vehicle, and a "latent risk" may refer to a risk of contact between the own vehicle and a mobile body that can rush out of a blind spot region.

(1-2) In an embodiment of the disclosure, in the contact risk estimation process, the one or more processors may be configured to estimate the risk of the contact, by estimating a course and a speed of the mobile body in the blind spot region, based on the movement direction and the movement speed of the mobile body that has entered the blind spot region and the temporal change in the blind spot region, and predicting an entry position and an entry speed at which the mobile body enters onto a path of the vehicle.

With this configuration, an estimation range of the course and the speed of the mobile body is narrowed based on the temporal change in the blind spot region, with respect to the movement direction and the movement speed of the mobile body at the time of entry to the blind spot region. This makes it possible to increase the prediction accuracy of the entry position and the entry speed of the mobile body that can rush out of the blind spot region.

The wording "the entry position and the entry speed of the mobile body" may refer to a position at which the mobile body rushes out of the blind spot region and overlaps with a traveling path of the own vehicle, and a speed of the mobile body at the time of overlap.

(1-3) In an embodiment of the disclosure, in the contact risk estimation process, the one or more processors may be configured to predict the entry position and the entry speed, by identifying a range where the mobile body is likely to be present in the blind spot region, based on the temporal change in the blind spot region, and estimating the course and the speed of the mobile body in the blind spot region, based on the movement direction and the movement speed of the mobile body that has entered the blind spot region and the range where the mobile body is likely to be present.

With this configuration, the course and the speed of the mobile body is estimated with low-practicality candidates of the course or the speed of the mobile body excluded, based on the temporal change in the blind spot region. This makes it possible to increase the prediction accuracy of the entry position and the entry speed of the mobile body that can rush out of the blind spot region onto the path of the vehicle.

2. Details of Example Embodiments of Disclosure

[2-1. Overall Configuration of Vehicle]

Description is given first of an example of an overall configuration of a vehicle including a driving assistance apparatus according to an example embodiment of the disclosure.

FIG. 1 is a schematic diagram illustrating a configuration example of a vehicle 1 including the driving assistance apparatus. The vehicle 1 may also be referred to as an own vehicle.

The vehicle 1 may be configured as a four-wheel drive vehicle that transmits driving torque to a left-front wheel 3LF, a right-front wheel 3RF, a left-rear wheel 3LR, and a right-rear wheel 3RR (in the following, collectively referred to as "wheels 3" unless a distinction is to be made between them). The driving torque may be outputted from a driving force source 9 that generates the driving torque for the vehicle 1. The driving force source 9 may be an internal combustion engine such as a gasoline engine or a diesel engine, or may be a driving motor. The driving force source 9 may include an internal combustion engine and a driving motor together.

Note that the vehicle 1 may be an electric vehicle including two driving motors, e.g., a front wheel driving motor and a rear wheel driving motor, or may be an electric vehicle including driving motors that correspond to the respective wheels 3. When the vehicle 1 is an electric vehicle or a hybrid electric vehicle, a secondary battery and a generator may be mounted on the vehicle 1. The secondary battery may accumulate electric power to be supplied to the driving motor. Examples of the generator may include a motor and a fuel cell. The generator may generate electric power to be charged in the battery.

The vehicle 1 may include, as devices to be used in driving control of the vehicle 1, the driving force source 9, an electric steering device 15, and brake devices 17LF, 17RF, 17LR, and 17RR (hereinafter collectively referred to as "brake devices 17" unless a distinction is to be made between them). The driving force source 9 may output the driving torque to be transmitted to a front wheel driving shaft 5F and a rear wheel driving shaft 5R via an unillustrated transmission, a front wheel differential mechanism 7F, and a rear wheel differential mechanism 7R. Driving of the driving force source 9 and the transmission may be controlled by a vehicle control unit 41 including one or more electronic control units (ECUs).

The electric steering device 15 may be provided on the front wheel driving shaft 5F. The electric steering device 15 may include an unillustrated electric motor and an unillustrated gear mechanism. The electric steering device 15 may be controlled by the vehicle control unit 41 to adjust steering angles of the left front wheel 3LF and the right front wheel 3RF. In manual driving, the vehicle control unit 41 may control the electric steering device 15 based on a steering angle of a steering wheel 13 by a driver who drives the vehicle 1. In automatic driving, the vehicle control unit 41 may control the electric steering device 15 based on a set traveling path.

The brake devices 17LF, 17RF, 17LR, and 17RR may give braking force respectively to the left-front, right-front, left-rear, and right-rear drive wheels 3LF, 3RF, 3LR, and 3RR. The brake device 17 may be configured as, for example, a hydraulic brake device. Hydraulic pressure to be supplied to each brake device 17 may be controlled by the vehicle control unit 41 to generate predetermined braking force. When the vehicle 1 is an electric vehicle or a hybrid electric vehicle, the brake device 17 may be used in conjunction with a regenerative brake by the driving motor.

The vehicle control unit 41 may include one or more electronic control units that control driving of the driving force source 9, the electric steering device 15, and the brake device 17. The driving force source 9 may output the driving torque for the vehicle 1. The electric steering device 15 may control the steering angle of the steering wheel 13 or a steered wheel. The brake device 17 may control the braking force of the vehicle 1. The vehicle control unit 41 may control the driving of the transmission that performs shifting of an output from the driving force source 9 and transmits the resultant output to the wheels 3. The vehicle control unit 41 may be configured to acquire data transmitted from a driving assistance apparatus 50, and may be configured to carry out automatic driving control of the vehicle 1.

The vehicle 1 may also include forward view capturing cameras 31LF and 31RF, a vehicle state sensor 35, a global navigation satellite system (GNSS) sensor 37, and a human machine interface (HMI) 43.

The forward view capturing cameras 31LF and 31RF may configure a surrounding environment sensor 31 that acquires data regarding a surrounding environment of the vehicle 1. The forward view capturing cameras 31LF and 31RF may capture a forward view of the vehicle 1 and generate image data. The forward view capturing cameras 31LF and 31RF may each include an image sensor such as a charged-coupled device (CCD) or a complementary metal-oxide-semiconductor (CMOS). The forward view capturing cameras 31LF and 31RF may transmit the generated image data to the driving assistance apparatus 50. In the vehicle 1 illustrated in FIG. 1, the forward view capturing cameras 31LF and 31RF may configure a stereo camera including a pair of left and right cameras. However, the forward view capturing cameras 31LF and 31RF may each be a stereo camera or a monocular camera.

In addition to the forward view capturing cameras 31LF and 31RF, the vehicle 1 may include, for example, a rearward view capturing camera, or a left or right rearward view capturing camera. The rearward view capturing camera may be provided in a rear part of the vehicle 1 and capture a rearward view of the vehicle 1. The left or right rearward view capturing camera may be provided on a side-view mirror and capture a left or right rearward view of the vehicle 1. The vehicle 1 may also include, as other examples of the surrounding environment sensor 31 that acquires the data regarding the surrounding environment, one or more of a light detection and ranging (LiDAR), a radar sensor such as a millimeter-wave radar, and an ultrasonic sensor.

The vehicle state sensor 35 may include one or more sensors that detect an operation state and behavior of the vehicle 1. The vehicle state sensor 35 may include, for example, one or more of a steering angle sensor, an accelerator position sensor, a brake stroke sensor, a brake pressure sensor, and an engine speed sensor. The vehicle state sensor 35 may thus detect the operation state of the vehicle 1 such as the steering angle of the steering wheel 13 or the steered wheel, an accelerator position, an amount of a brake operation, or an engine speed. Moreover, the vehicle state sensor 35 may include, for example, one or more of a vehicle speed sensor, an acceleration rate sensor, and an angular speed sensor. The vehicle state sensor 35 may thus detect the behavior of the vehicle such as a vehicle speed, a longitudinal acceleration rate, a lateral acceleration rate, or a yaw rate. The vehicle state sensor 35 may transmit a sensor signal including the detected data to the driving assistance apparatus 50.

The GNSS sensor 37 may receive satellite signals from positioning satellites such as GPS satellites. The GNSS sensor 37 may transmit, to the driving assistance apparatus 50, positional data on map data regarding the vehicle 1 included in the satellite signals received. Note that, instead of the GNSS sensor 37, an antenna that receives satellite signals from another satellite system that identifies the position of the vehicle 1 may be provided.

The HMI 43 may be driven by the driving assistance apparatus 50 to present the driver with various pieces of information by, for example, image display or sound output. The HMI 43 may include, for example, a display and a speaker. The display may be provided in an instrument panel. The speaker may be provided in the vehicle 1. The display may be a display of a navigation system. In addition, the HMI 43 may include a head-up display (HUD) that provides display on a windshield in superimposition over scenes around the own vehicle 1.

[2-2. Driving Assistance Apparatus]

Next, the driving assistance apparatus 50 according to the example embodiment is described in detail.

[2-2-1. Configuration Example]

The driving assistance apparatus 50 may serve as an apparatus that assists in driving the vehicle 1 by allowing one or more processors such as a central processing unit (CPU) to execute a computer program. The computer program may cause the one or more processors to perform operation described later to be performed by the driving assistance apparatus 50. The computer program to be executed by the one or more processors may be contained in a non-transitory recording medium that serves as a storage 53 provided in the driving assistance apparatus 50. In one embodiment, the storage 53 may serve as "one or more memories". Alternatively, the computer program to be executed by the one or more processors may be contained in a non-transitory recording medium built in the driving assistance apparatus 50, or any non-transitory recording medium externally attachable to the driving assistance apparatus 50.

The non-transitory recording medium containing the computer program may be: a magnetic medium such as a hard disk, a floppy disk, or a magnetic tape; an optical recording medium such as a compact disk read only memory (CD-ROM), a digital versatile disk (DVD), or a Blu-ray (registered trademark); a magnetic-optical medium such as a floptical disk; a memory such as a random access memory (RAM) or a read only memory (ROM); a flash memory such as a universal serial bus (USB) memory or a solid state drive (SSD); or any other medium that is able to hold programs.

Figure 2:
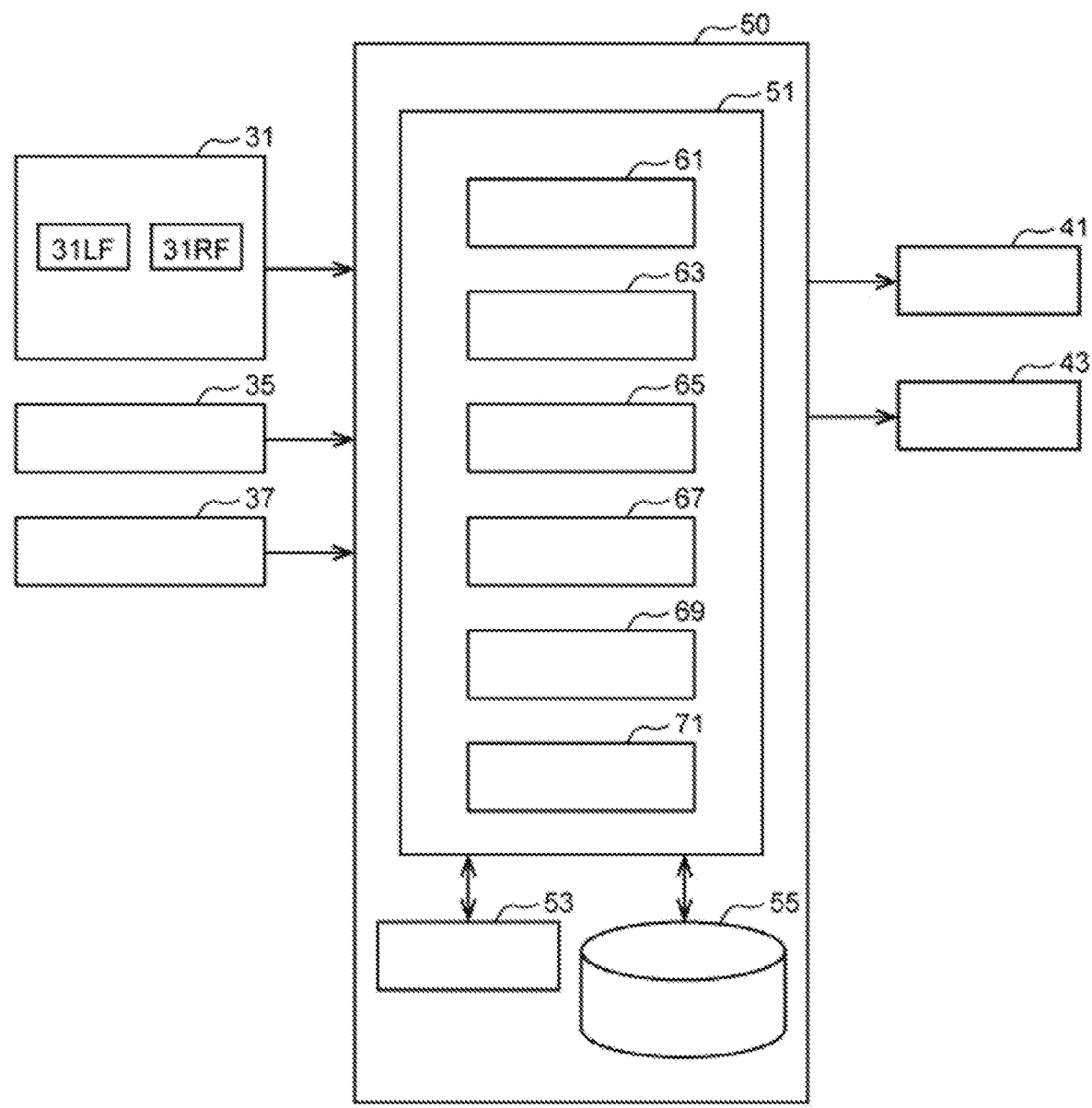
FIG. 2 is a block diagram illustrating a configuration example of the driving assistance apparatus according to one example embodiment.

FIG. 2 is a block diagram illustrating a configuration example of the driving assistance apparatus 50 according to the example embodiment.

To the driving assistance apparatus 50, the surrounding environment sensor 31, the vehicle state sensor 35, and the GNSS sensor 37 may be coupled via a dedicated line, or a communication system such as a controller area network (CAN) or a local interconnect network (LIN). The vehicle control unit 41 and the HMI 43 may also be coupled to the driving assistance apparatus 50. Note that the driving assistance apparatus 50 is not limited to an electronic control unit mounted on the vehicle 1, and may be a terminal device such as a smartphone or a wearable device.

The driving assistance apparatus 50 may include a processor 51, the storage 53, and a cumulative blind spot region database (DB) 55. The processor 51 may include one or more processors such as a CPU and various peripheral components. A portion or all of the processor 51 may be configured to be updatable by, for example, firmware. A portion or all of the processor 51 may be, for example, a program module to be executed in accordance with a command from a device such as a CPU.

The storage 53 may include a memory such as a RAM or a ROM. Note that the storage 53 is not particularly limited in type or number. The storage 53 is communicably coupled to the processor 51. The storage 53 may hold a computer program to be executed by the processor 51, and data including, for example, various parameters to be used in calculation processing, detection data, and calculation results. The cumulative blind spot region database 55 may include a memory such as a RAM or a ROM, or a storage medium such as a HDD, a CD, a DVD, a SSD, a USB flash, or a storage device. The cumulative blind spot region database 55 may hold data regarding a cumulative blind spot region calculated by the processor 51.

[2-2-2. Operational Configuration]

Description is given next of an operational configuration of the processor 51 of the driving assistance apparatus 50. The processor 51 may include a surrounding environment detection unit 61, a blind spot region detection unit 63, a mobile body detection unit 65, a contact risk estimation unit 67, a driving condition setting unit 69, and a notification control unit 71. These units may be implemented by execution of the computer program by the one or more processors such as a CPU. Note that a portion or all of the surrounding environment detection unit 61, the blind spot region detection unit 63, the mobile body detection unit 65, the contact risk estimation unit 67, the driving condition setting unit 69, and the notification control unit 71 may be configured by an analog circuit.

[Surrounding Environment Detection Unit]

The surrounding environment detection unit 61 may execute a process of detecting the surrounding environment of the own vehicle 1 based on detection data transmitted from the surrounding environment sensor 31 at every predetermined sampling cycle, i.e., a surrounding environment detection process. In one example, the surrounding environment detection unit 61 may detect an object such as a surrounding vehicle, a bicycle, a building, or a person present around the own vehicle 1 by an object detection technique, by performing image processing on image data received from the forward view capturing cameras 31LF and 31RF. In addition, the surrounding environment detection unit 61 may calculate a position of the object such as a surrounding vehicle or a bicycle as viewed from the own vehicle 1, a distance from the own vehicle 1 to the object such as a surrounding vehicle or a bicycle, and a relative speed of the object such as a surrounding vehicle or a bicycle with respect to the own vehicle 1.

[Blind Spot Region Detection Unit]

The blind spot region detection unit 63 may execute, based on the data regarding the surrounding environment of the own vehicle 1 detected by the surrounding environment detection unit 61, a process of detecting a blind spot region as viewed from the own vehicle 1 formed by a blind spot forming object, i.e., a blind spot region detection process. For example, the blind spot region detection unit 63 may detect a blind spot region as viewed from the own vehicle 1, and calculate a temporal change in the blind spot region, in which the blind spot region detected at a predetermined time changes as the own vehicle 1 travels. When a blind spot region as viewed from the own vehicle 1 is present at a given time, a portion of the blind spot region gradually enters sight as the own vehicle 1 travels, and an area of the blind spot region identified at first thus gradually decreases as the own vehicle 1 travels. When a blind spot forming object is detected in front of the own vehicle 1, the blind spot region detection unit 63 may identify a blind spot region resulting from the blind spot forming object. The blind spot region detection unit 63 may also calculate a region continuously kept as the blind spot region. i.e., a cumulative blind spot region, excluding a region that enters the sight with elapse of time after the detection, i.e., a blind spot resolved region.

For example, the blind spot region detection unit 63 may detect a three-dimensional object that can serve as the blind spot forming object, based on a result of detection by the surrounding environment detection unit 61. Typical examples of the blind spot forming object may include a parked or stopped vehicle, and a building such as a sidewall or a hedge, but are not limited to these three-dimensional objects. The blind spot region detection unit 63 may detect the blind spot forming object or the blind spot region, using data regarding the position on the map data of the own vehicle 1 and road data ahead in a traveling direction acquired via the GNSS sensor 37.

The blind spot region detection unit 63 may calculate a temporal change in a bird's-eye two-dimensional blind spot region as viewed from above the own vehicle 1 or the blind spot forming object, or calculate a temporal change in a two-dimensional blind spot region as viewed from the own vehicle 1. The bird's-eye two-dimensional blind spot region as viewed from above the own vehicle 1 or the blind spot forming object may be defined by a horizontal direction and a depth direction as viewed from the own vehicle 1, and the two-dimensional blind spot region as viewed from the own vehicle 1 may be defined by the horizontal direction and a height direction as viewed from the own vehicle 1. In the example embodiment, the blind spot region detection unit 63 may calculate a cumulative blind spot region defined by the horizontal direction and the depth direction as viewed from the own vehicle 1, and a cumulative blind spot region defined by the horizontal direction and the height direction as viewed from the own vehicle 1.

The calculated cumulative blind spot region may be sequentially saved in the cumulative blind spot region database 55 until the own vehicle 1 passes by the blind spot forming object. This makes it possible to keep track of a change in the cumulative blind spot region with elapse of time at every predetermined sampling cycle.

[Mobile Body Detection Unit]

The mobile body detection unit 65 may execute, based on the data regarding the surrounding environment of the own vehicle 1 detected by the surrounding environment detection unit 61, a process of detecting a mobile body that has entered the blind spot region detected by the blind spot region detection unit 63 from outside the blind spot region, i.e., a mobile body detection process. In one example, the mobile body detection unit 65 may identify, out of detected objects, an object having a speed greater than zero as a mobile body. For each mobile body, the mobile body detection unit 65 may calculate a movement direction and a movement speed of the mobile body, based on a change in position at every predetermined sampling cycle. When an identified mobile body overlaps with the blind spot region and becomes undetected, the mobile body detection unit 65 may store the movement direction and the movement speed of the mobile body at the time of the last detection of the mobile body.

[Contact Risk Estimation Unit]

The contact risk estimation unit 67 may execute a process, i.e., a contact risk estimation process, of estimating a risk of contact between the own vehicle 1 and the mobile body, based on the movement direction and the movement speed of the mobile body identified by the mobile body detection unit 65, and the temporal change in the blind spot region calculated by the blind spot region detection unit 63. When a mobile body is detected by the mobile body detection unit 65, the contact risk estimation unit 67 may estimate a risk of contact between the own vehicle 1 and the mobile body, i.e., an apparent risk, based on the movement direction and the movement speed of the mobile body and a movement direction and a movement speed of the own vehicle 1. In one example, when the own vehicle 1 and the mobile body are positioned within a predetermined distance at the same time, the contact risk estimation unit 67 may determine that the own vehicle 1 and the mobile body can come into contact with each other, and estimate the risk of contact higher as the distance is closer.

When a mobile body is detected by the mobile body detection unit 65, the contact risk estimation unit 67 may repeat the estimation of the risk of contact between the own vehicle 1 and the mobile body, i.e., the apparent risk, until the mobile body becomes undetected. The contact risk estimation unit 67 may estimate the apparent risk for each mobile body detected.

In addition, when a detected mobile body enters a blind spot region, the contact risk estimation unit 67 may estimate a risk of contact between the own vehicle 1 and the mobile body, i.e., a latent risk, based on the movement direction and the movement speed of the mobile body at the time of the last detection of the mobile body, the temporal change in the blind spot region, and the movement direction and the movement speed of the own vehicle 1. In one example, the contact risk estimation unit 67 may estimate a course and a speed of the mobile body in the blind spot region, based on the movement direction and the movement speed of the mobile body that has entered the blind spot region from outside the blind spot region, and the temporal change in the blind spot region. The contact risk estimation unit 67 may thus predict an entry position and an entry speed at which the mobile body rushes out of the blind spot region and enters onto a path of the own vehicle 1. A case where the mobile body that has entered the blind spot region is still undetected by the surrounding environment sensor 31 of the own vehicle 1, while an area of the cumulative blind spot region becomes smaller as the own vehicle 1 travels, indicates that the mobile body remains in the blind spot region. In this case, as the area of the cumulative blind spot region becomes smaller, a range where the mobile body is likely to be present in the cumulative blind spot region is gradually narrowed. The course and the speed of the mobile body in the cumulative blind spot region are also gradually narrowed.

For example, when the mobile body is a bicycle, the bicycle is likely to be present in a region, of the cumulative blind spot region, having a height and a width equal to or greater than a size of the bicycle and a person riding the bicycle. Hereinafter, the "bicycle" may refer to a bicycle and a person riding the bicycle. Consequently, the bicycle is unlikely to be present in, of the cumulative blind spot region, a region lower than a height of the bicycle and a region narrower than a width of the bicycle. A position where the bicycle is likely to be present in the cumulative blind spot region is thus limited. In addition, there is a limit on an allowable acceleration or deceleration range or an allowable turning range of the mobile body, and a movement range of the mobile body is thus limited also in terms of the movement direction and the movement speed of the mobile body. Thus, the contact risk estimation unit 67 may, at every predetermined sampling cycle, assume the range where the mobile body is likely to be present in the cumulative blind spot region, and set at least one course and at least one speed of the mobile body in the cumulative blind spot region.

The contact risk estimation unit 67 may predict at least one entry position and at least one entry speed of the mobile body onto the path of the own vehicle 1, based on at least one course and at least one speed set for the mobile body, and the movement direction and the movement speed of the own vehicle 1, at every predetermined sampling cycle. The contact risk estimation unit 67 may thus estimate the risk of contact between the own vehicle 1 and the mobile body, i.e., the latent risk. In one example, when the own vehicle 1 and the mobile body are positioned within a predetermined distance at the same time, the contact risk estimation unit 67 may determine that the own vehicle 1 and the mobile body can come into contact with each other, and estimate the risk of contact higher as the distance is closer. In the estimation, the course and the speed of the mobile body in the blind spot region may be estimated with respect to, as a starting point, a position where the mobile body has entered the blind spot region. This makes it possible to increase estimation accuracy of the course and the speed of the mobile body in the blind spot region. Consequently, it is possible to increase prediction accuracy of the entry position and the entry speed of the mobile body onto the path of the own vehicle 1.

The contact risk estimation unit 67 may estimate the latent risk based on a type of the mobile body that has entered the blind spot region. The range where the mobile body is likely to be present in the cumulative blind spot region, and the allowable acceleration or deceleration range or the allowable turning range can differ depending on the type of the mobile body, such as a four-wheeled vehicle, a motorcycle, a bicycle, or a pedestrian. Thus, the contact risk estimation unit 67 may estimate the latent risk based on the type of the mobile body, which makes it possible to increase the estimation accuracy of the course and the speed of the mobile body in the blind spot region, and to increase the prediction accuracy of the entry position and the entry speed of the mobile body onto the path of the own vehicle 1. Consequently, it is possible to increase estimation accuracy of the risk of contact between the own vehicle 1 and the mobile body that can rush out of the blind spot region. Note that the type of the mobile body may be data indicating the type of the object itself, such as a vehicle, a motorcycle, a bicycle, or a pedestrian, or may be data regarding an attribute that indicates a predetermined class defined in terms of, for example, size or speed.

When a mobile body that has entered a blind spot region at a predetermined time does not rush out of the blind spot region, the contact risk estimation unit 67 may repeat the estimation of the course and the speed of the mobile body in the blind spot region, and the estimation of the risk of contact between the own vehicle 1 and the mobile body, i.e., the latent risk, until the own vehicle 1 passes by the blind spot forming object. The contact risk estimation unit 67 may estimate the latent risk for each mobile body detected. In addition, after a mobile body enters a blind spot region at a predetermined time, when the mobile body that has rushed out of the blind spot region is detected by the mobile body detection unit 65, the contact risk estimation unit 67 may estimate the risk of contact between the own vehicle 1 and the mobile body, based on the movement direction and the movement speed of the detected mobile body, and the movement direction and the movement speed of the own vehicle 1.

[Driving Condition Setting Unit]

The driving condition setting unit 69 may basically set a driving condition of the own vehicle 1 to avoid contact with an obstacle present ahead in the traveling direction of the own vehicle 1. In this case, the obstacle may include not only a mobile body but also a stationary object. For example, during automatic driving of the own vehicle 1, the driving condition setting unit 69 may set the traveling path that makes it possible to avoid contact between the own vehicle and the obstacle, and set a target steering angle that causes the own vehicle 1 to travel along the traveling path. For example, the driving condition setting unit 69 may set the traveling path of the own vehicle 1, using a risk potential serving as an index indicating a possibility of the own vehicle 1 coming into contact with the obstacle. In this case, the risk potential may be set to indicate a higher risk of contact as the distance to the obstacle is closer, and the driving condition setting unit 69 may set the traveling path to cause the own vehicle 1 to travel on a path that makes the risk of contact smaller. When the risk potential is set to indicate a lower risk of contact as the vehicle speed is smaller, the driving condition setting unit 69 may reduce the risk of contact by setting the traveling path and the vehicle speed.

In the example embodiment, the driving condition setting unit 69 may reflect, in the risk potential, the latent risk of the mobile body that has entered the blind spot region rushing out of the blind spot region and coming into contact with the own vehicle 1, and set the driving condition to cause the own vehicle 1 to travel on a path that makes the risk of contact smaller. In one example, when it is determined that the mobile body that has entered the blind spot region can come into contact with the own vehicle 1, based on the latent risk estimated by the contact risk estimation unit 67, the driving condition setting unit 69 may set the traveling path to increase a distance between the own vehicle 1 and the blind spot forming object. When it is difficult to sufficiently reduce the risk of contact by changing the traveling path, the driving condition setting unit 69 may reduce the risk of contact by decelerating the own vehicle 1, in addition to changing the traveling path or instead of changing the traveling path.

The driving condition setting unit 69 may set a target steering angle and a target acceleration or deceleration rate based on the set traveling path and vehicle speed, and transmit data regarding the target steering angle and the target acceleration or deceleration rate to the vehicle control unit 41. The vehicle control unit 41 may control traveling of the own vehicle 1, based on the acquired data regarding the target steering angle and the target acceleration or deceleration rate. This makes it possible to cause the own vehicle 1 to travel while not only reducing the risk of contact with the detected obstacle, i.e., the apparent risk, but also reducing the risk of contact with the mobile body that has entered the blind spot region, i.e., the latent risk. In this case, the driving condition setting unit 69 may so set the target steering angle and the target acceleration or deceleration rate as not to exceed a preset upper limit of a steering angular speed or a preset upper limit of an acceleration or deceleration rate. This makes it possible to control traveling of the own vehicle 1 to prevent occurrence of sudden steering or sudden deceleration, making it possible to reduce a sense of discomfort of an occupant of the own vehicle 1.

[Notification Control Unit]

The notification control unit 71 may control driving of the HMI 43 to provide notification to the occupant of the own vehicle 1. For example, the notification control unit 71 may notify the occupant of the own vehicle 1 of the presence of the latent risk of the own vehicle 1 coming into contact with the mobile body that has entered the blind spot region. The notification control unit 71 may provide notification of the presence of the risk of contact, by outputting alert sound or voice or displaying an image or text. Contents of the notification are not particularly limited. The notification control unit 71 may output predetermined alert sound or voice, may display an image or text, or may provide notification of, for example, the entry position or the entry speed of the mobile body onto the path of the own vehicle 1.

[2-3. Operation of Driving Assistance Apparatus]

Next, an example of operation of the driving assistance apparatus according to the example embodiment is described with reference to flowcharts.

Figure 3:
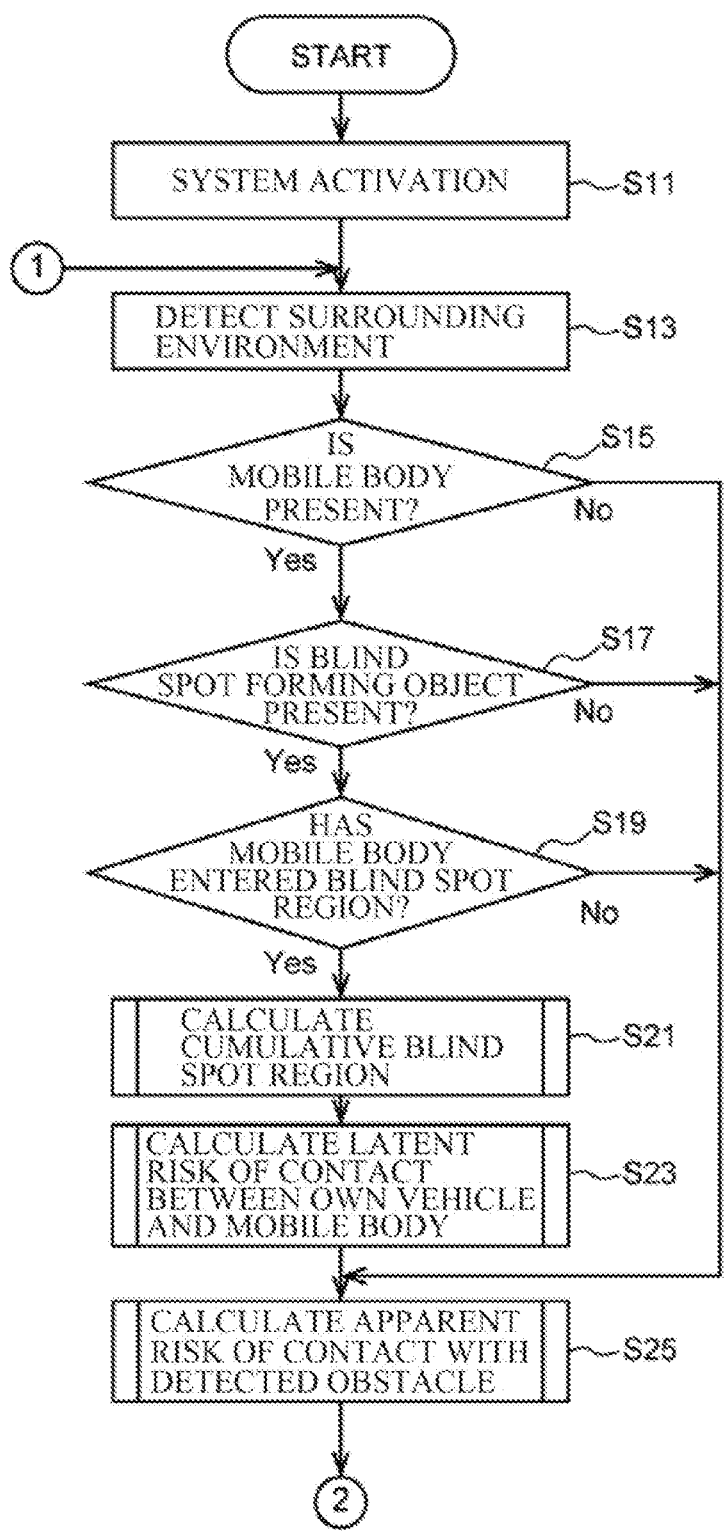
FIG. 3 is a flowchart illustrating a main routine of a control process performed by the driving assistance apparatus according to one example embodiment.
Figure 4:
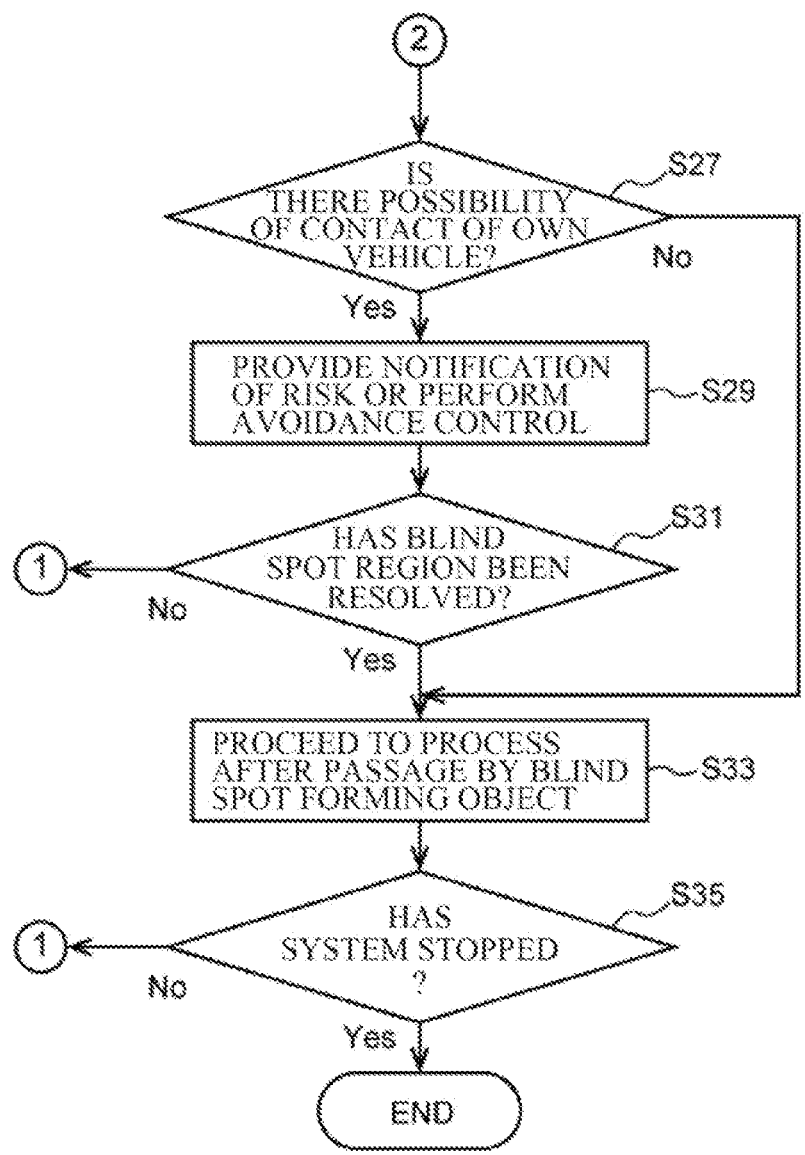
FIG. 4 is a flowchart illustrating the main routine of the control process performed by the driving assistance apparatus according to one example embodiment.

FIG. 3 to FIG. 4 are flowcharts illustrating an example of operation of the driving assistance apparatus 50.

First, upon activation of a system including the driving assistance apparatus 50 (step S11), the surrounding environment detection unit 61 of the processor 51 may acquire detection data transmitted from the surrounding environment sensor 31, and execute the surrounding environment detection process based on the detection data (step S13). In the example embodiment, based on the detection data transmitted from the surrounding environment sensor 31, the surrounding environment detection unit 61 may detect at least an object, such as another vehicle, a person, a building, a traffic sign, or a lane line, present ahead in the traveling direction of the own vehicle 1. In addition, the surrounding environment detection unit 61 may calculate the position and the speed of the detected object, and the distance from the own vehicle 1 to the object.

Thereafter, the mobile body detection unit 65 of the processor 51 may determine, based on the detected data regarding the surrounding environment, whether a mobile body having a speed greater than zero is present ahead in the traveling direction of the own vehicle 1 (step S15). If a mobile body is absent ahead in the traveling direction of the own vehicle 1 (step S15: No), the processor 51 may cause the flow to proceed to a process of calculating the risk of contact with a detected obstacle, i.e., the apparent risk (step S25).

If a mobile body is present ahead in the traveling direction of the own vehicle 1 (step S15: Yes), the blind spot region detection unit 63 of the processor 51 may determine whether a blind spot forming object that can form a blind spot region as viewed from the own vehicle 1 is present ahead in the traveling direction of the own vehicle 1 (step S17). For example, the blind spot region detection unit 63 may calculate the size and the position of each object detected by the surrounding environment detection unit 61, and the relative speed of each object with respect to the own vehicle 1, and determine the presence or absence of a three-dimensional object that can form a blind spot region as viewed from the own vehicle 1. For example, the blind spot region detection unit 63 may determine that the three-dimensional object corresponds to a blind spot forming object, when the three-dimensional object has a lateral width, a height, and a depth equal to or greater than respective preset dimensions, the object is present within a preset distance from the path along which the own vehicle 1 is to travel, and the relative speed is equal to or less than a preset speed threshold.

If a blind spot forming object that can form a blind spot region is absent (step S17: No), the processor 51 may cause the flow to proceed to the process of calculating the risk of contact with a detected obstacle, i.e., the apparent risk (step S25). If a blind spot forming object that can form a blind spot region is present (step S17: Yes), the mobile body detection unit 65 may determine whether the detected mobile body has entered the blind spot region (step S19). For example, the mobile body detection unit 65 may determine that the mobile body detected in the previous sampling cycle has entered the blind spot region, when the mobile body becomes undetected and it is determined that the mobile body has overlapped with the blind spot region based on the movement direction and the movement speed of the mobile body and a position of the blind spot region.

If it is not determined that the detected mobile body has entered the blind spot region (step S19: No), the processor 51 may cause the flow to proceed to the process of calculating the risk of contact with a detected obstacle, i.e., the apparent risk (step S25). If it is determined that the detected mobile body has entered the blind spot region (step S19: Yes), the blind spot region detection unit 63 may execute a process of calculating a cumulative blind spot region, i.e., a cumulative blind spot region calculation process (step S21).

Figure 5:
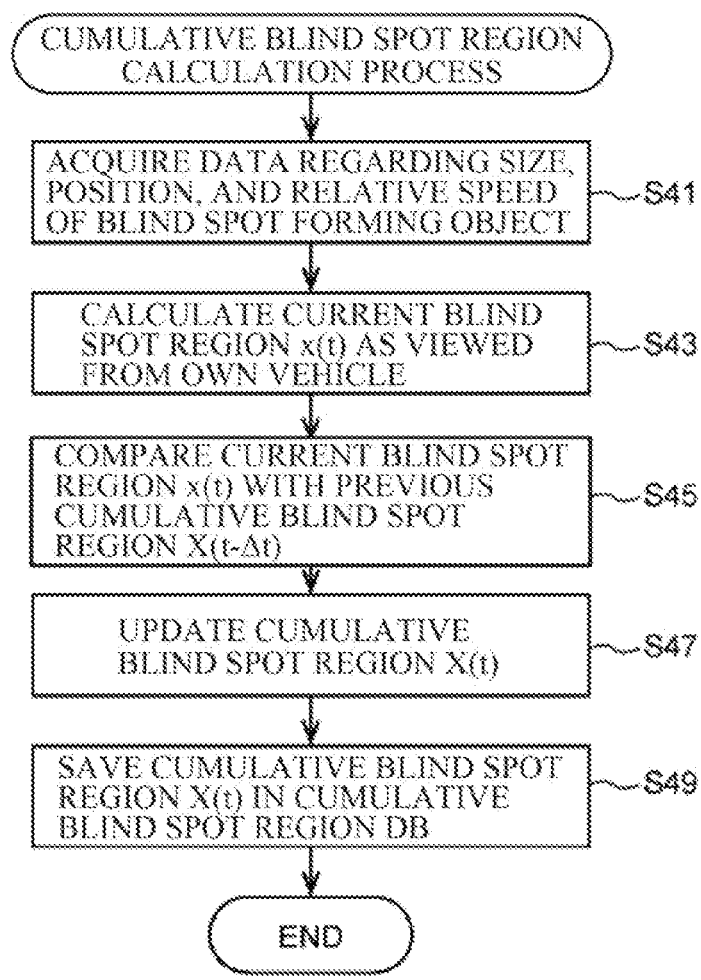
FIG. 5 is a flowchart illustrating an example of a cumulative blind spot region calculation process performed by the driving assistance apparatus according to one example embodiment.

FIG. 5 is a flowchart illustrating the cumulative blind spot region calculation process.

First, the blind spot region detection unit 63 may acquire data regarding the size, the position, and the relative speed of the three-dimensional object determined as the blind spot forming object (step S41). Thereafter, the blind spot region detection unit 63 may calculate a current blind spot region x(t) formed by the blind spot forming object as viewed from the own vehicle 1, based on the size of the blind spot forming object and a position relationship between the blind spot forming object and the own vehicle 1 (step S43). For example, the blind spot region detection unit 63 may identify a region positioned farther than the blind spot forming object as viewed from the own vehicle 1, of a region surrounded by multiple straight lines. The multiple straight lines may pass through a position where the forward view capturing cameras 31LF and 31RF are installed in the own vehicle 1 and multiple points on an outline of the blind spot forming object as viewed from the own vehicle 1. The identified blind spot region x(t) may be obtained as a region in the horizontal direction, the height direction, and the depth direction as viewed from the own vehicle 1.

Note that, after a blind spot forming object is detected, the blind spot region detection unit 63 may repeat the calculation of the blind spot region x(t) at every predetermined processing cycle, until the own vehicle 1 passes by the blind spot forming object.

Thereafter, the blind spot region detection unit 63 may compare the calculated current blind spot region x(t) with a previous cumulative blind spot region X(t−Δt) saved in the cumulative blind spot region database 55 (step S45). The blind spot region detection unit 63 may identify, of the previous cumulative blind spot region X(t−Δt), a blind spot resolved region "y" not overlapping with the current blind spot region x(t).

Thereafter, the blind spot region detection unit 63 may update a cumulative blind spot region X(t) and calculate the cumulative blind spot region X(t) in the present processing cycle (step S47). Thus, of the blind spot region x(t) identified upon detection of the blind spot forming object by the own vehicle 1, the blind spot resolved region y that has entered the sight of the own vehicle 1 as the own vehicle 1 travels may be excluded, and the cumulative blind spot region X(t) continuously kept as the blind spot region may be calculated.

Thereafter, the blind spot region detection unit 63 may save the calculated cumulative blind spot region X(t) in the cumulative blind spot region database 55 (step S49). Thus, when calculating the cumulative blind spot region X(t) next time or later, it is possible to refer to the earlier cumulative blind spot region X(t−Δt). Note that, in the blind spot region calculation process performed first after it is determined that the blind spot forming object that forms the blind spot region x is present, the calculated blind spot region x(t) may be saved as the cumulative blind spot region X(t).

A method of calculating the cumulative blind spot region X is now described in detail with reference to FIG. 6.

Figure 6:
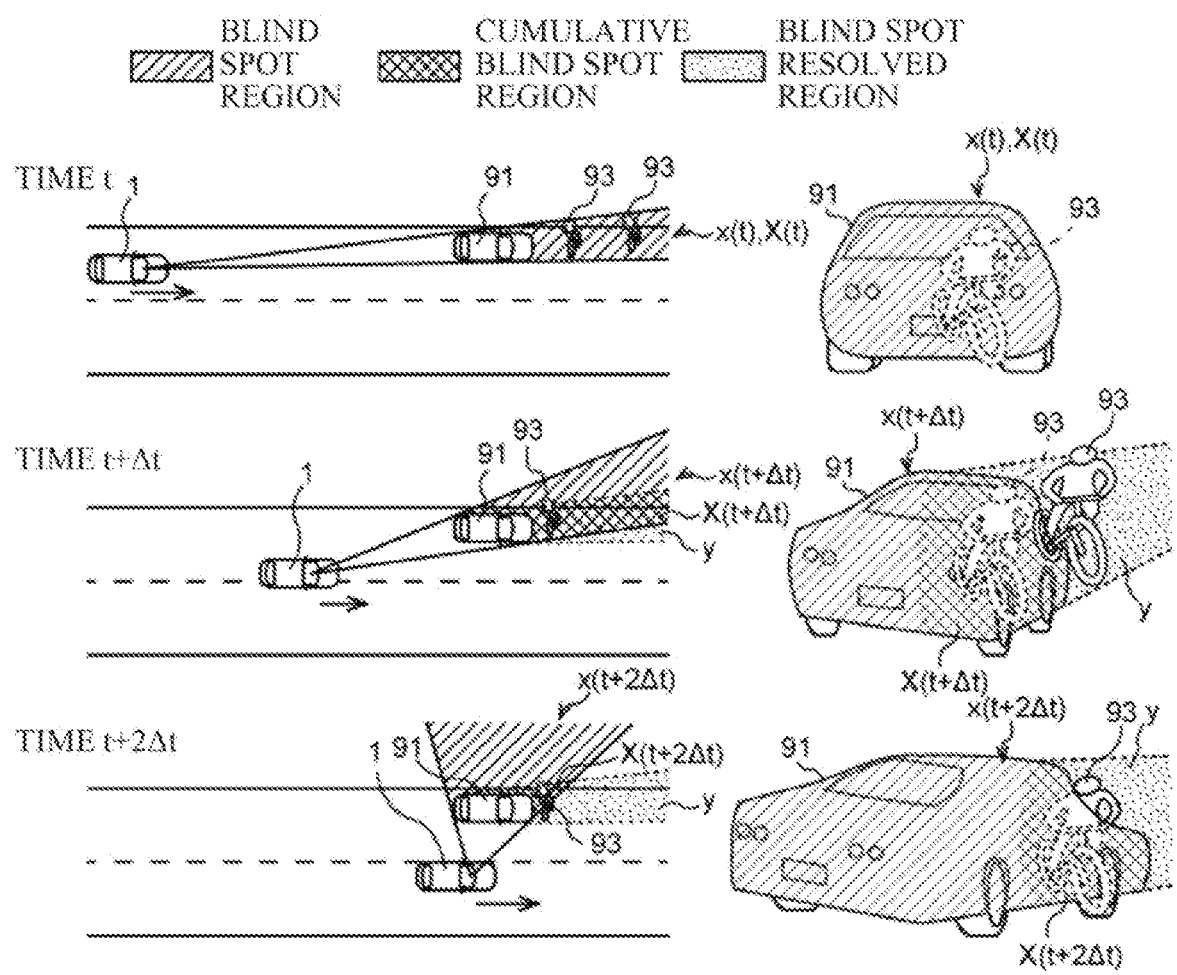
FIG. 6 is an explanatory diagram illustrating a range where a mobile body is likely to be present in a cumulative blind spot region.

FIG. 6 is an explanatory diagram illustrating a range where the mobile body is likely to be present in the cumulative blind spot region X. FIG. 6 illustrates an example in which the blind spot forming object is a parked vehicle 91, and the mobile body is a bicycle. FIG. 6 illustrates bird's-eye two-dimensional blind spot regions x(t), x(t+Δt), and x(t+Δ2t), and two-dimensional blind spot regions x(t), x(t+Δt), and x(t+Δ2t) as viewed from the own vehicle 1.

At a time t, the blind spot region detection unit 63 may identify the blind spot region x(t) formed by the parked vehicle 91 detected ahead in the traveling direction of the own vehicle 1. The blind spot region detection unit 63 may set the blind spot region x(t) identified upon detection of the parked vehicle 91 as the cumulative blind spot region X(t). The blind spot regions x(t+Δt) and x(t+Δ2t) at the respective times t+Δt and t+Δ2t change as the own vehicle 1 travels. Thus, at the times t+Δt and t+Δ2t, a partial region of the blind spot region x(t) detected at the time t gradually enters the sight of the own vehicle 1, and the blind spot resolved region y gradually increases with elapse of time.

At the respective times t+Δt and t+Δ2t, the blind spot region detection unit 63 may set, as cumulative blind spot regions X(t+Δt) and X(t+Δ2t), blind spot regions overlapping with the blind spot regions x(t) and x(t+Δt)) detected up to the earlier times t and t+Δt. In other words, the cumulative blind spot region X(t+Δt) at the time t+Δt may be a region where the cumulative blind spot region X(t) at the time t and the blind spot region x(t+Δt) at the time t+Δt overlap with each other, and the cumulative blind spot region X(t+Δ2t) at the time t+Δ2t may be a region where the cumulative blind spot region X(t+Δt) at the time t+Δt and the blind spot region x(t+Δ2t) at the time t+Δ2t overlap with each other. The cumulative blind spot region X(t+Δ2t) at the time t+Δ2t may also be expressed as a region where the blind spot region x(t) at the time t, the blind spot region x(t+Δt) at the time t+Δt, and the blind spot region x(t+Δ2t) at the time t+Δ2t overlap with each other.

The blind spot region detection unit 63 may repeatedly execute the cumulative blind spot region calculation process at every predetermined processing cycle, until the own vehicle 1 passes by the blind spot forming object, or until the risk of contact between the own vehicle 1 and the mobile body that can rush out of the blind spot region, i.e., the latent risk, becomes absent.

Returning to FIG. 3, after the process of calculating the cumulative blind spot region X(t) by the blind spot region detection unit 63 is executed in step S21, the contact risk estimation unit 67 of the processor 51 may execute a process of calculating the risk of contact between the own vehicle 1 and the mobile body that has entered the blind spot region x(t), i.e., the latent risk (step S23).

Figure 7:
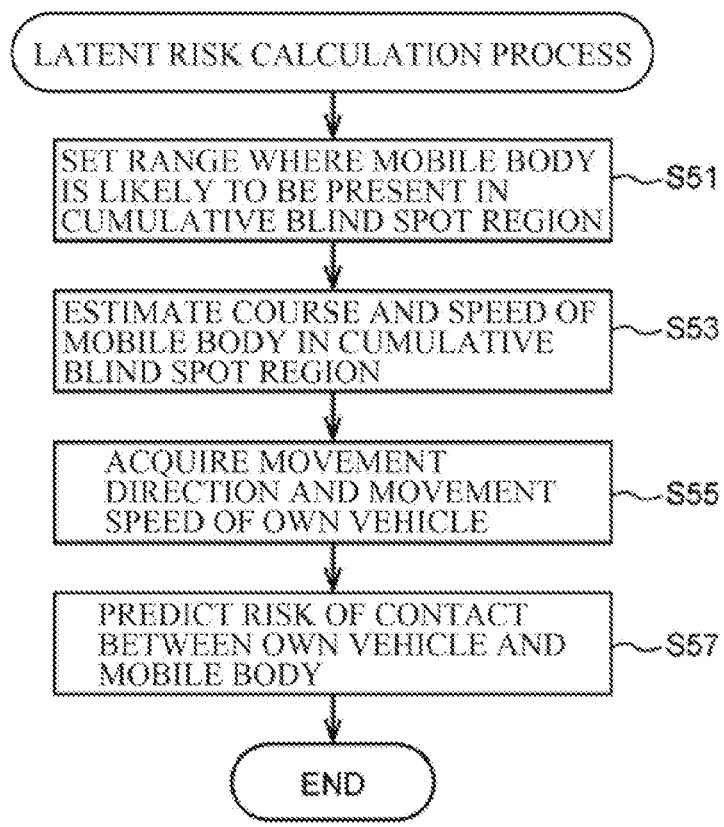
FIG. 7 is a flowchart illustrating an example of a latent risk calculation process performed by the driving assistance apparatus according to one example embodiment.

FIG. 7 is a flowchart illustrating a latent risk calculation process.

First, the contact risk estimation unit 67 may set, of the cumulative blind spot region X(t) calculated in step S21, a range where the mobile body that has entered the blind spot region x(t) is likely to be present (step S51). In one example, the contact risk estimation unit 67 may identify the range where the mobile body is likely to be present, based on the size of the detected mobile body and the size of the cumulative blind spot region X(t). For example, the contact risk estimation unit 67 may identify a range beyond the width and the height of the mobile body, of the cumulative blind spot region X(t), based on the area and the shape of the bird's-eye two-dimensional cumulative blind spot region X(t), and the area and the shape of the cumulative blind spot region X(t) including a height-direction component of the blind spot forming object as viewed from the own vehicle 1.

Referring to FIG. 6 described above, when consideration is given to bird's-eye two-dimensional cumulative blind spot regions X(t), X(t+Δt), and X(t+Δ2t), it is possible to set the range where the mobile body (a bicycle 93) is likely to be present in the cumulative blind spot regions X(t) and X(t+Δt) at the times t and t+Δt. In contrast, the area of the cumulative blind spot region X(t+Δ2t) is small at the time t+Δ2t, and it is not possible to set the range where the mobile body (the bicycle 93) is likely to be present. Moreover, when consideration is given to not only the bird's-eye two-dimensional cumulative blind spot regions X(t), X(t+Δt), and X(t+Δ2t) but also two-dimensional cumulative blind spot regions X(t), X(t+Δt), and X(t+Δ2t) as viewed from the own vehicle 1, the range where the mobile body (the bicycle 93) is likely to be present is further narrowed. For example, a space above a hood of the parked vehicle 91 also gradually enters the sight as the own vehicle 1 travels. Thus, at the time t+Δt, the actual range where the bicycle 93 is likely to be present is narrowed, even within the range where the bicycle 93 is likely to be present on the bird's-eye two-dimensional cumulative blind spot region X(t+Δt).

Returning to FIG. 7, the contact risk estimation unit 67 may thereafter estimate the course and the speed of the mobile body in the cumulative blind spot region X(t) (step S53). For example, the contact risk estimation unit 67 may set at least one presence position of the mobile body in the range where the mobile body is likely to be present set in step S51, based on the movement direction and the movement speed of the mobile body at the time of entry of the mobile body to the blind spot region x(t), and the allowable turning range and the allowable acceleration or deceleration range corresponding to the type of the mobile body. While the area and the shape of the cumulative blind spot region X(t) change with elapse of time, the contact risk estimation unit 67 may set the course of each mobile body, by coupling positions of the mobile body likely to be present in the cumulative blind spot region X(t) calculated at the respective times. The course to be set may be a course along a direction in which the mobile body is able to enter onto the path of the own vehicle 1. The contact risk estimation unit 67 may set one or more courses for each of all mobile body that have entered the blind spot region x(t). The settable course becomes shorter as the area or the width of the cumulative blind spot region X(t) becomes smaller.

In addition, the contact risk estimation unit 67 may set, as the speed of the mobile body, a speed obtained by dividing a distance from the presence position of the mobile body set in the previous processing cycle to the presence position of the mobile body set in the present processing cycle, by a time interval of the processing cycle. Note that the contact risk estimation unit 67 may estimate the acceleration or deceleration rate of the mobile body, by dividing a difference between the speed set in the previous processing cycle and the speed set in the present processing cycle by the time interval of the processing cycle.

A method of estimating the course and the speed of the mobile body in the blind spot region is now described in detail with reference to FIGS. 8 to 10.

Figure 8:
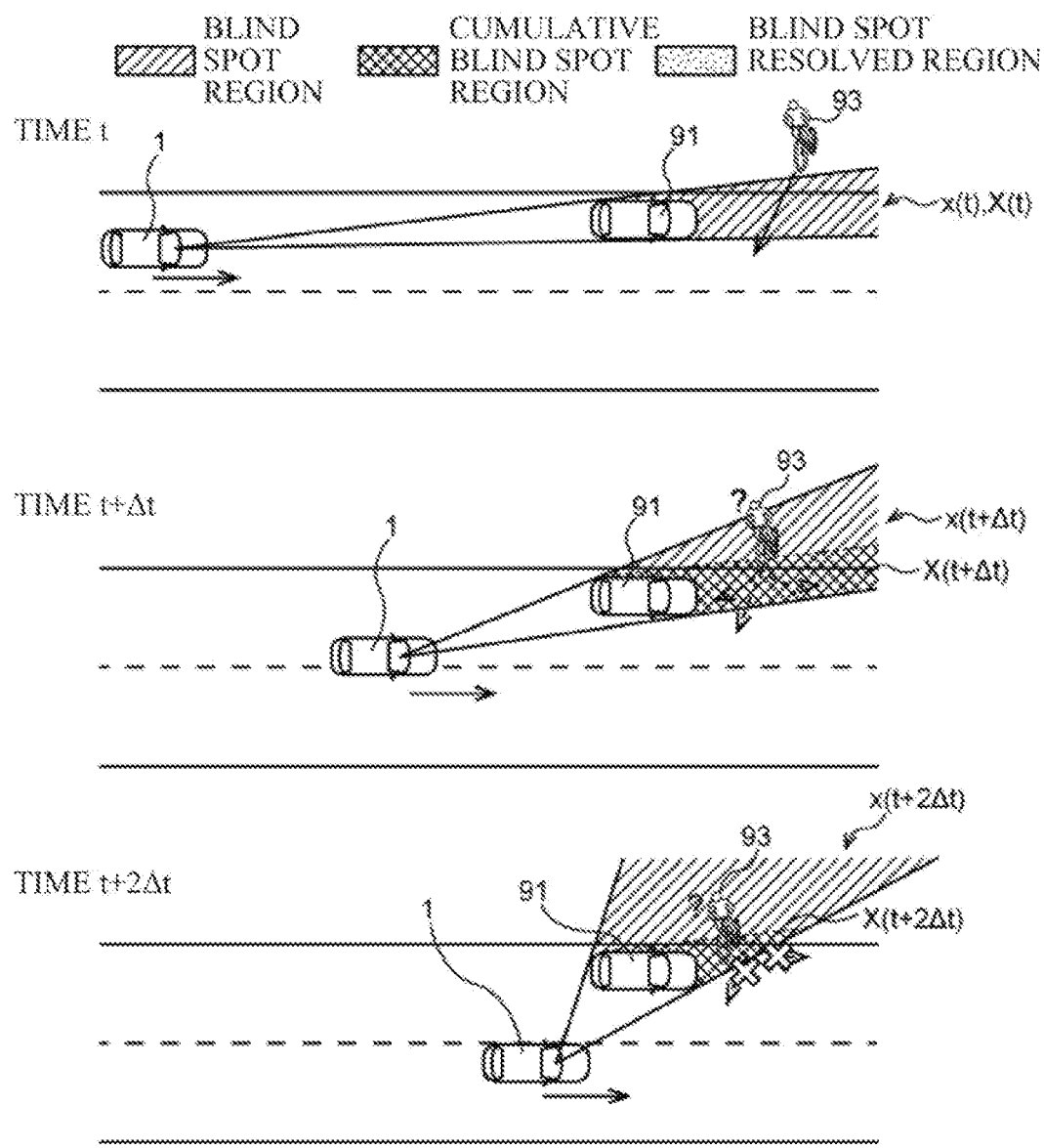
FIG. 8 is an explanatory diagram illustrating a prediction pattern of a course and a speed of a mobile body in a blind spot region in a first example.

FIG. 8 is an explanatory diagram illustrating a first example, and illustrates a traveling scene where the own vehicle 1 passes by the parked vehicle 91. FIG. 8 illustrates the bird's-eye two-dimensional blind spot region and cumulative blind spot region.

At the time t, the bicycle 93 serving as the mobile body and the parked vehicle 91 serving as the blind spot forming object are detected ahead in the traveling direction of the own vehicle 1 by the surrounding environment detection unit 61. The mobile body detection unit 65 may calculate and store the movement direction and the movement speed of the bicycle 93. The blind spot region detection unit 63 may identify the blind spot region x(t) as viewed from the own vehicle 1 resulting from the parked vehicle 91, and set the blind spot region x(t) identified upon detection of the parked vehicle 91 as the cumulative blind spot region X(t).

The blind spot regions x(t+Δt) and x(t+2Δt) at the respective times t+Δt and t+2Δt change as the own vehicle 1 travels. Thus, at the times t+Δt and t+2Δt, a partial region of the blind spot region x(t) detected at the time t gradually enters the sight of the own vehicle 1, and the blind spot resolved region y gradually increases with elapse of time. At the respective times t+Δt and t+2Δt, the blind spot region detection unit 63 may set, as the cumulative blind spot regions X(t+Δt) and X(t+2Δt), blind spot regions overlapping with the blind spot regions x(t) and x(t+Δt)) detected up to the earlier times t and t+Δt.

When the mobile body detection unit 65 detects that the bicycle 93 has entered the blind spot region x(t+Δt) at the time t+Δt, the contact risk estimation unit 67 may estimate the course and the speed of the bicycle 93 in the blind spot region x(t+Δt). Because this calculation predicts the risk of contact between the own vehicle 1 and the bicycle 93, actually estimated may be the course and the speed of the bicycle 93 in the cumulative blind spot region X(t+Δt) positioned on the side of the path of the own vehicle 1. In one example, the contact risk estimation unit 67 may set the range where the bicycle 93 is likely to be present in the cumulative blind spot region X(t+Δt). The contact risk estimation unit 67 may also estimate the course and the speed of the bicycle 93, based on the movement direction and the movement speed of the bicycle 93 at the time t, and the preset allowable acceleration or deceleration range and the preset allowable turning range of the bicycle 93. In the example illustrated in FIG. 8, three patterns of the course and the speed of the bicycle 93 may be set at the time t+Δt, but the number of patterns of the course and the speed to be set is not particularly limited.

Moreover, at the time t+Δ2t, the contact risk estimation unit 67 may estimate the course and the speed of the bicycle 93 in the blind spot region x(t+Δ2t). Also in this case, because this calculation predicts the risk of contact between the own vehicle 1 and the bicycle 93, actually estimated may be the course and the speed of the bicycle 93 in the cumulative blind spot region X(t+Δ2t) positioned on the side of the path of the own vehicle 1. In one example, the contact risk estimation unit 67 may set the range where the bicycle 93 is likely to be present in the cumulative blind spot region X(t+Δ2t). The contact risk estimation unit 67 may also estimate the course and the speed of the bicycle 93, based on the movement direction (i.e., the course) and the movement speed (i.e., the speed) of the bicycle 93 set at the time t+Δt, and the preset allowable acceleration or deceleration range and the preset allowable turning range of the bicycle 93.

In the example illustrated in FIG. 8, one course and one speed are estimated at the time t+Δ2t, because the range where the bicycle 93 is likely to be present in the cumulative blind spot region X(t+Δ2t) is narrow, and two of the patterns of the course and the speed of the bicycle 93 set at the time t+Δt are not assumable. In other words, when the bicycle 93 moves in the two patterns not assumable, the bicycle 93 rushes out of the blind spot region x(t+Δ2t) and enters the sight of the own vehicle 1, which makes it unnecessary to predict the course and the speed. Consequently, at the time t+Δ2t, it is possible to increase the estimation accuracy of the course and the speed of the bicycle 93 that has entered the blind spot region x(t).

Figure 9:
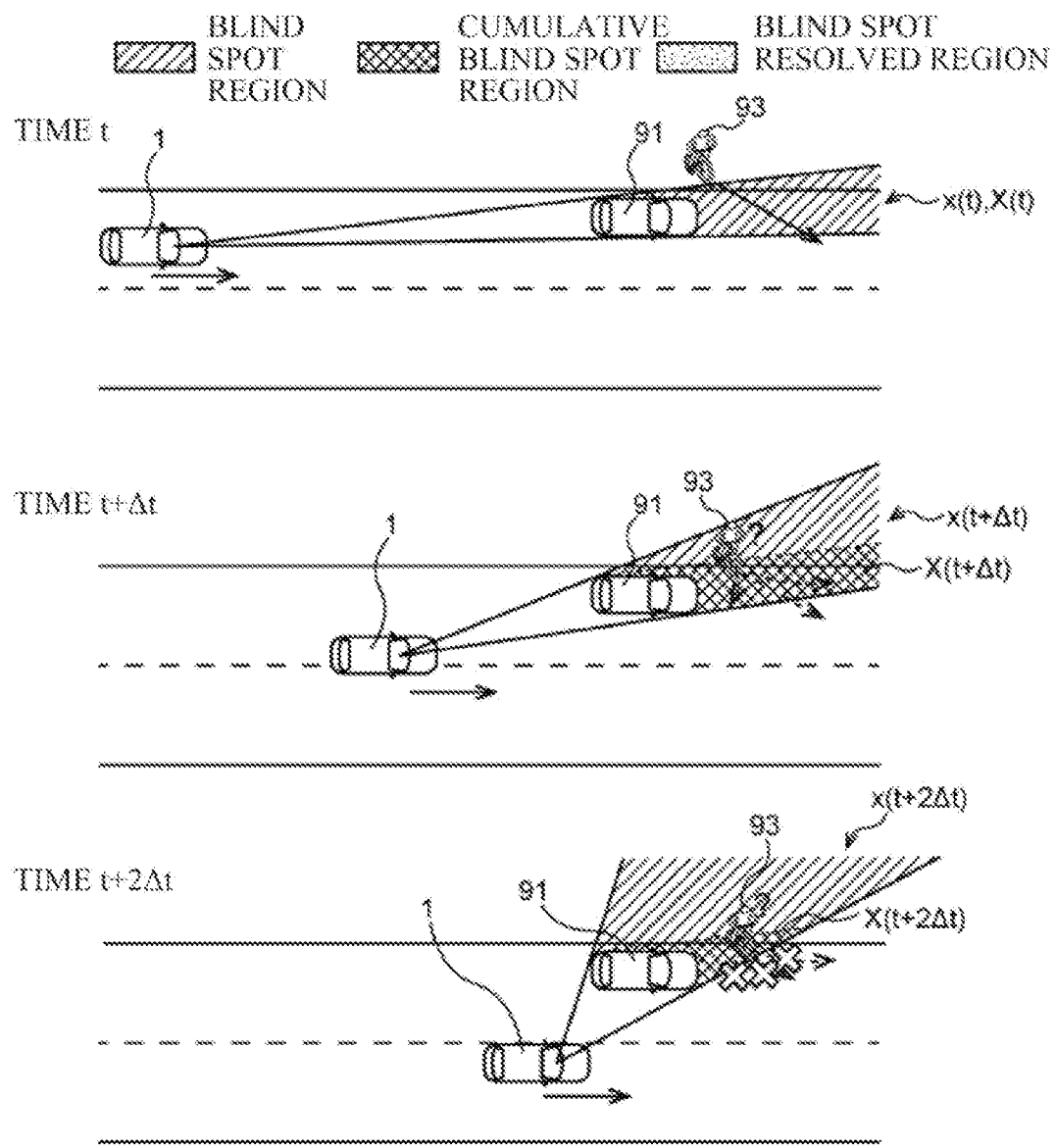
FIG. 9 is an explanatory diagram illustrating a prediction pattern of a course and a speed of a mobile body in a blind spot region in a second example.

FIG. 9 is an explanatory diagram illustrating a second example, and illustrates a traveling scene where the own vehicle 1 passes by the parked vehicle 91. FIG. 9 illustrates the bird's-eye two-dimensional blind spot region and cumulative blind spot region. The second example is an example in which the movement direction of the mobile body (the bicycle 93) is different from that in the first example.

Also in the second example, at the respective times t and t+Δt, t+2Δt, the blind spot regions x(t), x(t+Δt), and x(t+2Δt) and the cumulative blind spot regions X(t), X(t+Δt), and X(t+2Δt) are identified, as in the first example. When the mobile body detection unit 65 detects that the bicycle 93 has entered the blind spot region x(t+Δt) at the time t+Δt, the contact risk estimation unit 67 may estimate the course and the speed of the bicycle 93 in the blind spot region x(t+Δt). In the example illustrated in FIG. 9, three patterns of the course and the speed of the bicycle 93 may be set at the time t+Δt, but the number of patterns of the course and the speed to be set is not particularly limited.

At the time t+Δ2t, the contact risk estimation unit 67 may estimate the course and the speed of the bicycle 93 in the blind spot region x(t+Δ2t). In the example illustrated in FIG. 9, at the time t+Δ2t, the range where the bicycle 93 is likely to be present in the cumulative blind spot region X(t+Δ2t) is narrow. Moreover, in consideration of the course and the speed of the bicycle 93 set at the time t+Δt, and the preset allowable acceleration or deceleration range and the preset allowable turning range of the bicycle 93, it is not assumable that the bicycle 93 has moved in the pattern set at the time t+Δt. The contact risk estimation unit 67 may thus estimate, at the time t+Δ2t, that the bicycle 93 has stopped in the cumulative blind spot region X(t+Δ2t).

Figure 10:
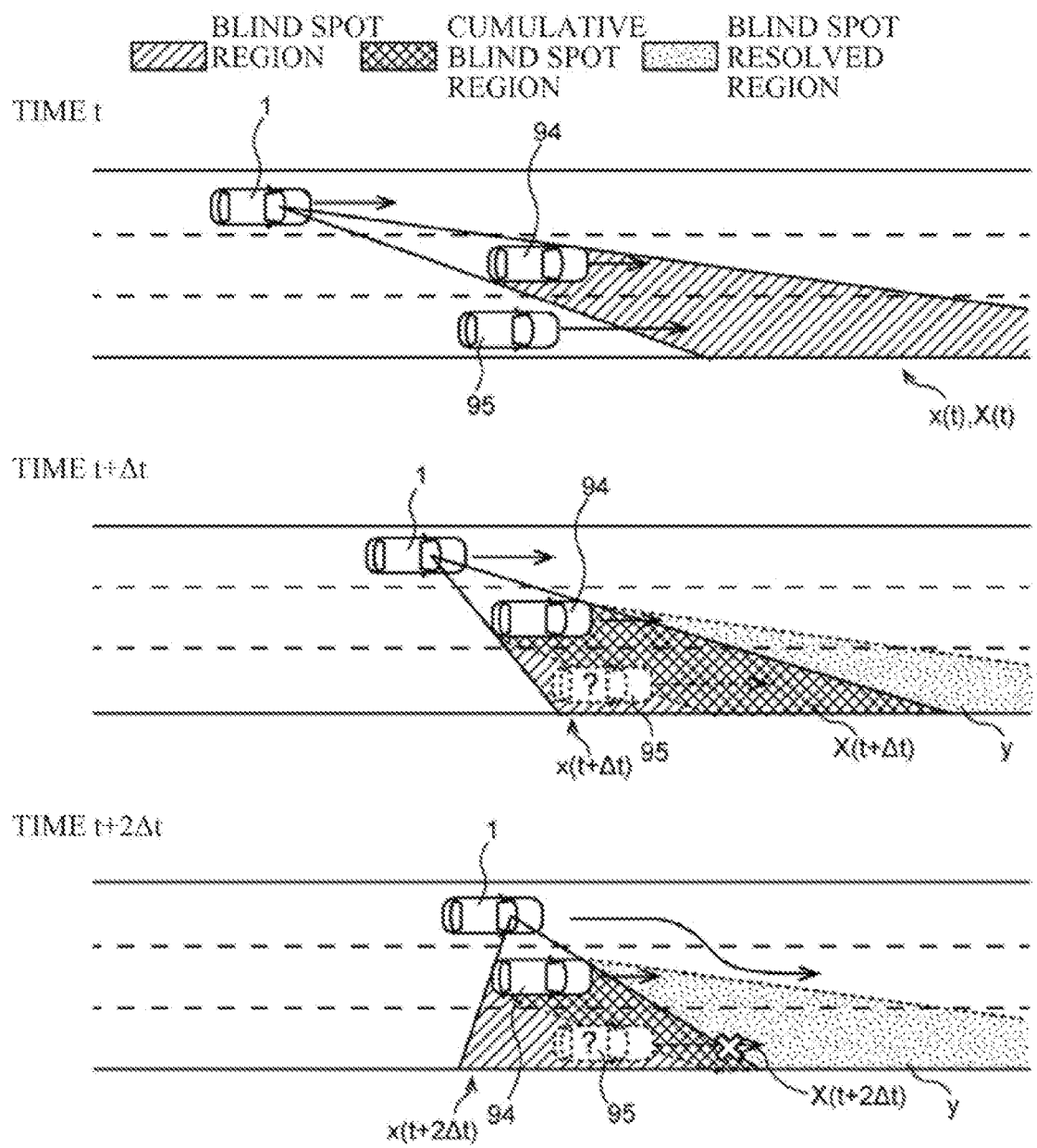
FIG. 10 is an explanatory diagram illustrating a prediction pattern of a course and a speed of a mobile body in a blind spot region in a third example.

FIG. 10 is an explanatory diagram illustrating a third example, and illustrates a traveling scene where the own vehicle 1 traveling on a left lane of a road with three lanes on each side passes a first other vehicle 94 traveling on a middle lane and makes a lane change to the middle lane. FIG. 10 illustrates the bird's-eye two-dimensional blind spot region and cumulative blind spot region.

At the time t, a second other vehicle 95 serving as the mobile body and the first other vehicle 94 serving as the blind spot forming object are detected ahead in the traveling direction of the own vehicle 1 by the surrounding environment detection unit 61. The mobile body detection unit 65 may calculate and store the movement direction and the movement speed of the second other vehicle 95. The second other vehicle 95 is assumed to be traveling at a speed slower than the own vehicle 1 and faster than the first other vehicle 94. The blind spot region detection unit 63 may identify the blind spot region x(t) as viewed from the own vehicle 1 resulting from the first other vehicle 94, and set the blind spot region x(t) identified upon detection of the first other vehicle 94 as the cumulative blind spot region X(t).

The blind spot regions x(t+Δt) and x(t+Δ2t) at the respective times t+Δt and t+2Δt change as the own vehicle 1 travels. Thus, at the times t+Δt and t+2Δt, a partial region of the blind spot region x(t) detected at the time t gradually enters the sight of the own vehicle 1, and the blind spot resolved region y gradually increases with elapse of time. At the respective times t+Δt and t+2Δt, the blind spot region detection unit 63 may set, as the cumulative blind spot regions X(t+Δt) and X(t+2Δt), blind spot regions overlapping with the blind spot regions x(t) and x(t+Δt)) detected up to the earlier times t and t+Δt.

When the mobile body detection unit 65 detects that the second other vehicle 95 has entered the blind spot region x(t+Δt) at the time t+Δt, the contact risk estimation unit 67 may estimate the course and the speed of the second other vehicle 95 in the blind spot region x(t+Δt). Because this calculation predicts the risk of contact after the own vehicle 1 passes the first other vehicle 94, actually estimated may be the course and the speed of the second other vehicle 95 in the cumulative blind spot region X(t+Δt) positioned on the front side of the first other vehicle 94. In one example, the contact risk estimation unit 67 may set the range where the second other vehicle 95 is likely to be present in the cumulative blind spot region X(t+Δt). The contact risk estimation unit 67 may also estimate the course and the speed of the second other vehicle 95, based on the movement direction and the movement speed of the second other vehicle 95 at the time t, and the preset allowable acceleration or deceleration range and the preset allowable turning range of the second other vehicle 95 that is a four-wheeled vehicle. In the example illustrated in FIG. 10, at the time t+Δt, the course and the speed may be set assuming that the second other vehicle 95 keeps the movement direction and the movement speed at the time t, but the number of patterns of the course and the speed to be set is not particularly limited.

Moreover, at the time t+Δ2t, the contact risk estimation unit 67 may estimate the course and the speed of the second other vehicle 95 in the blind spot region x(t+Δ2t). Also in this case, because this calculation predicts the risk of contact after the own vehicle 1 passes the first other vehicle 94, actually estimated may be the course and the speed of the second other vehicle 95 in the cumulative blind spot region X(t+Δ2t) positioned on the front side of the first other vehicle 94. In one example, the contact risk estimation unit 67 may set the range where the second other vehicle 95 is likely to be present in the cumulative blind spot region X(t+Δ2t). The contact risk estimation unit 67 may also estimate the course and the speed of the second other vehicle 95, based on the movement direction (i.e., the course) and the movement speed (i.e., the speed) of the second other vehicle 95 set at the time t+Δt, and the preset allowable acceleration or deceleration range and the preset allowable turning range of the second other vehicle 95 that is a four-wheeled vehicle.

In the example illustrated in FIG. 10, a situation at the time t+Δ2t is a situation in which the second other vehicle 95 is not detected by the own vehicle 1, and the course and the speed of the second other vehicle 95 set at the time t+Δt are not assumable. At the time t+Δ2t, the contact risk estimation unit 67 may thus estimate the course and the speed, assuming that the second other vehicle 95 has decelerated. In this case, it is obvious that the vehicle speed of the second other vehicle 95 is slow relative to the speeds of the own vehicle 1 and the first other vehicle 94. It may thus be determined that the second other vehicle 95 is unlikely to make a lane change in front of the first other vehicle 94. Consequently, at the time t+Δ2t, it is possible to estimate that the second other vehicle 95 that has entered the blind spot region x(t) is no longer likely to change its course to the front of the first other vehicle 94.

Returning to FIG. 7, after estimating the course and the speed of the mobile body in the blind spot region, the contact risk estimation unit 67 may acquire data regarding the movement direction and the movement speed of the own vehicle 1 (step S55). The movement direction of the own vehicle 1 may be, for example, obtained by calculation based on a temporal change in the positional data regarding the own vehicle 1 detected by the GNSS sensor 37, or may be acquired from the navigation system via the vehicle control unit 41. As the movement speed of the own vehicle 1, for example, data regarding the vehicle speed detected by the vehicle speed sensor may be acquired via the vehicle control unit 41. Note that methods of acquiring the data regarding the movement direction and the movement speed of the own vehicle 1 are not limited to the examples described above.

Thereafter, the contact risk estimation unit 67 may predict the risk of contact between the own vehicle 1 and the mobile body, i.e., the latent risk, based on the course and the speed of the mobile body in the cumulative blind spot region X(t), and the movement direction and the movement speed of the own vehicle 1 (step S57). In one example, the contact risk estimation unit 67 may predict at least one entry position and at least one entry speed of the mobile body onto the path of the own vehicle 1, based on the course and the speed of the mobile body estimated in step S53 and the movement direction of the own vehicle 1 acquired in step S55. The contact risk estimation unit 67 may predict the entry position and the entry speed of the mobile body onto the path of the own vehicle 1, assuming that the mobile body rushes out of the blind spot region and enters onto the path of the own vehicle 1 while keeping the estimated course and speed of the mobile body.

In addition, the contact risk estimation unit 67 may calculate whether the own vehicle 1 and the mobile body can be positioned within a predetermined distance at the same time, based on the course and the speed of the mobile body estimated in step S53 and the movement direction and the movement speed of the own vehicle 1 acquired in step S55. When the own vehicle 1 and the mobile body are positioned within a predetermined distance at the same time, the contact risk estimation unit 67 may determine that the own vehicle 1 and the mobile body can come into contact with each other, and predict the latent risk higher as the distance is closer.

Returning to FIG. 3, after calculating the latent risk in step S23, the contact risk estimation unit 67 may further execute the process of calculating the risk of contact between the own vehicle 1 and an obstacle detected by the surrounding environment sensor 31, i.e., the apparent risk (step S25).

Figure 11:
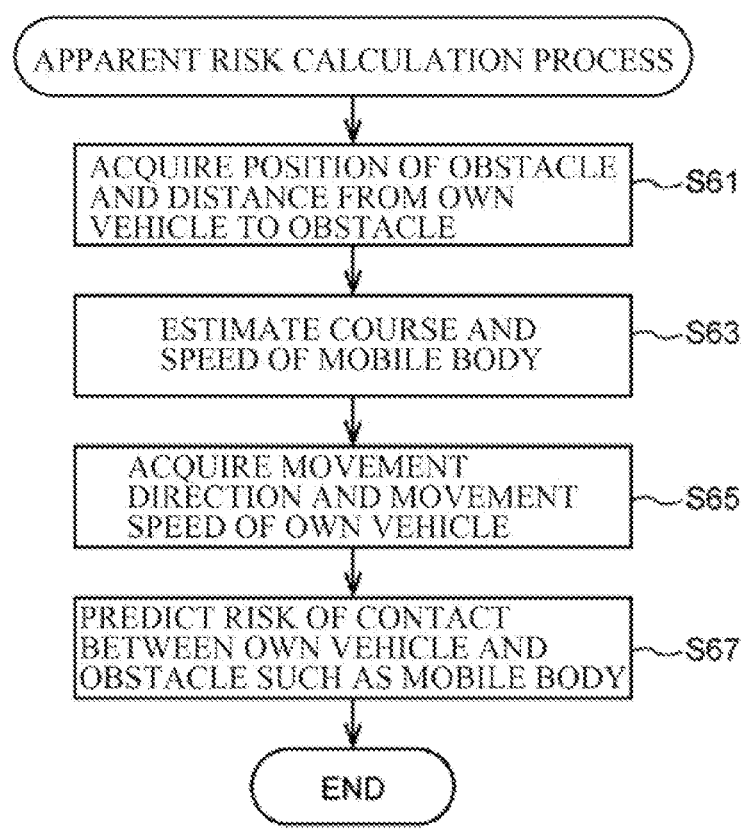
FIG. 11 is a flowchart illustrating an example of an apparent risk calculation process performed by the driving assistance apparatus according to one example embodiment.

FIG. 11 is a flowchart illustrating an apparent risk calculation process.

First, the contact risk estimation unit 67 may acquire data regarding the position of the obstacle and the distance from the own vehicle 1 to the obstacle detected in the surrounding environment detection process in step S13 (step S61). Examples of the obstacle may include a mobile body having a speed greater than zero, such as a traveling other vehicle, a bicycle, or a pedestrian. Examples of the obstacle may also include a stationary object having a zero speed, such as a stopped other vehicle, a curb, a traffic sign, a building, or a guardrail. In addition, as data regarding the obstacle, data regarding a boundary of a road or a traveling lane, such as a lane line, may be acquired together.

Thereafter, the contact risk estimation unit 67 may estimate the course and the speed for a mobile body out of obstacles acquired in step S61 (step S63). For example, the contact risk estimation unit 67 may estimate the course and the speed of the mobile body, based on a temporal change in the position of the detected mobile body.

Thereafter, as in step S55, the contact risk estimation unit 67 may acquire data regarding the movement direction and the movement speed of the own vehicle 1 (step S65).

Thereafter, the contact risk estimation unit 67 may predict the risk of contact between the own vehicle 1 and the detected obstacle, i.e., the apparent risk (step S67). In one example, the contact risk estimation unit 67 may calculate whether the own vehicle 1 and an obstacle standing still can be positioned within a predetermined distance, based on the position of the obstacle standing still and the movement direction of the own vehicle 1. When the own vehicle 1 and the obstacle standing still are positioned within a predetermined distance at a given time, the contact risk estimation unit 67 may determine that the own vehicle 1 and the obstacle can come into contact with each other, and predict the apparent risk higher as the distance is closer.

The contact risk estimation unit 67 may also predict at least one entry position and at least one entry speed of the mobile body onto the path of the own vehicle 1, based on the course and the speed of the mobile body estimated in step S63 and the movement direction of the own vehicle 1 acquired in step S65. In addition, the contact risk estimation unit 67 may calculate whether the own vehicle 1 and the mobile body can be positioned within a predetermined distance at the same time, based on the course and the speed of the mobile body estimated in step S63 and the movement direction and the movement speed of the own vehicle 1 acquired in step S65. When the own vehicle 1 and the mobile body are positioned within a predetermined distance at the same time, the contact risk estimation unit 67 may determine that the own vehicle 1 and the mobile body can come into contact with each other, and predict the apparent risk higher as the distance is closer.

After the apparent risk is calculated in step S25 of FIG. 3, the driving condition setting unit 69 may determine whether there is a possibility of contact of the own vehicle 1, based on the latent risk calculated in step S23 and the apparent risk calculated in step S25 (step S27). For example, the driving condition setting unit 69 may determine whether one or both of the latent risk and the apparent risk is equal to or greater than a preset risk value.

If it is determined that a risk target, e.g., an obstacle, can come into contact with the own vehicle 1 (step S27: Yes), one or both of a notification process by the notification control unit 71 and an avoidance process by the driving condition setting unit 69 may be executed (step S29). The notification process may be a process of notifying the occupant of the own vehicle 1 that the own vehicle 1 can come into contact with the obstacle. The avoidance process may be a process of avoiding contact between the own vehicle 1 and the obstacle. For example, the notification control unit 71 may provide notification that the own vehicle 1 can come into contact with a mobile body that can rush out of the blind spot region. The driving condition setting unit 69 may set a driving condition that makes it possible to avoid contact with not only the obstacle detected by the surrounding environment sensor 31, but also the mobile body that can rush out of the blind spot region.

For example, the notification control unit 71 may provide notification of the presence of the latent risk or the apparent risk, by outputting alert sound or voice or displaying an image or text. Contents of the notification are not particularly limited. The notification control unit 71 may output predetermined alert sound or voice, may display an image or text, or may provide notification of, for example, the entry position or the entry speed of the mobile body that enters ahead in the traveling direction of the own vehicle 1 from the blind spot region.

The driving condition setting unit 69 may set the traveling path to increase the distance between the own vehicle 1 and the obstacle or the blind spot forming object, to avoid contact of the own vehicle 1. Increasing the distance between the own vehicle 1 and the obstacle or the blind spot forming object makes it possible to reduce the risk of contact of the own vehicle 1. When contact with the obstacle or the mobile body that can rush out of the blind spot region is unavoidable by changing the traveling path, the driving condition setting unit 69 may decelerate the own vehicle 1 to avoid contact of the own vehicle 1, in addition to changing the traveling path or instead of changing the traveling path. The driving condition setting unit 69 may set the target steering angle and the target acceleration or deceleration rate based on the set traveling path and vehicle speed, and transmit data regarding the target steering angle and the target acceleration or deceleration rate to the vehicle control unit 41. The vehicle control unit 41 may control traveling of the own vehicle 1, based on the acquired data regarding the target steering angle and the target acceleration or deceleration rate.

After the notification process or the avoidance process is executed in step S29, the blind spot region detection unit 63 may determine whether the detected blind spot region has been resolved (step S31). For example, the blind spot region detection unit 63 may determine that the detected blind spot region has been resolved when the cumulative blind spot region becomes absent. In another example, the blind spot region detection unit 63 may determine that the detected blind spot region has been resolved when the own vehicle 1 passes by the blind spot forming object that has formed the blind spot region. The blind spot region detection unit 63 may store the position on the map data of the detected blind spot forming object, and determine that the own vehicle 1 has passed by the blind spot forming object when the own vehicle 1 passes through the position.

If it is not determined that the blind spot region has been resolved (step S31: No), the processor 51 may cause the flow to return to step S13, and repeat the processes of the steps described above. If it is determined that the blind spot region has been resolved (step S31: Yes), the driving condition setting unit 69 may cause the flow to proceed to a process after passage by the blind spot forming object (step S33). For example, the driving condition setting unit 69 may start a process of returning the traveling path changed to increase the distance between the own vehicle 1 and the blind spot forming object to a reference position, such as the center of a road, or accelerating the own vehicle 1 to return the vehicle speed to a reference vehicle speed.

If it is not determined that there is a possibility of contact of the own vehicle 1 in step S27 described above (step S27: No), the driving condition setting unit 69 may cause the flow to proceed to the process after passage by the blind spot forming object, regardless of whether the own vehicle 1 has passed by the blind spot forming object (step S33). Thus, even before the own vehicle 1 passes by the blind spot forming object, when the own vehicle 1 and the mobile body that rushes out of the blind spot region are unlikely to come into contact with each other, it is possible to quickly return the traveling path or the vehicle speed to the original traveling path or vehicle speed. This makes it possible to reduce inconvenience felt by the occupant of the own vehicle 1.

After the flow proceeds to the process after passage by the blind spot forming object in step S33, the processor 51 may determine whether the system of the own vehicle 1 including the driving assistance apparatus 50 has stopped (step S35). If the system has not stopped (step S35: No), the processor 51 may cause the flow to return to step S13, and repeat the processes of the steps described above. If the system has stopped (step S35: Yes), the processor 51 may stop the operation of the driving assistance apparatus 50.

As described above, the driving assistance apparatus 50 according to the example embodiment identifies the blind spot region x at a predetermined time when the blind spot forming object that forms the blind spot region is detected ahead in the traveling direction of the own vehicle 1, and calculates the cumulative blind spot region X indicating the temporal change in the blind spot region x with traveling of the own vehicle 1 after the predetermined time. When a mobile body that has entered the blind spot region x is detected, the driving assistance apparatus 50 may estimate the course and the speed of the mobile body in the cumulative blind spot region X, based on the movement direction and the movement speed of the mobile body that has entered the blind spot region x from outside the blind spot region x, and the change in the cumulative blind spot region X. The driving assistance apparatus 50 thus estimates the latent risk of the mobile body rushing out of the blind spot region x and coming into contact with the own vehicle 1. Thus, even when the detected mobile body enters the blind spot region x, it is possible to change the traveling path of the own vehicle 1 or perform deceleration operation of the own vehicle 1, to avoid contact between the own vehicle 1 and the mobile body that rushes out of the blind spot region x.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in an embodiment of the disclosure, in the contact risk estimation process, the one or more processors may be configured to estimate the risk of the contact further based on a type of the mobile body.

This configuration allows the course and the movement speed of the mobile body in the blind spot region to be predicted in consideration of the size or the assumed speed that differs depending on the type of the mobile body. This makes it possible to increase the prediction accuracy of the entry position and the entry speed of the mobile body that can rush out of the blind spot region onto the path of the vehicle.

In an embodiment of the disclosure, in the contact risk estimation process, the one or more processors may be configured to estimate the risk of the contact further based on a position where the mobile body has entered the blind spot region.

With this configuration, it is possible to predict a track of the mobile body from the position at the time of entry to the blind spot region. This makes it possible to increase the prediction accuracy of the entry position and the entry speed of the mobile body that can rush out of the blind spot region onto the path of the vehicle.

As used herein, the term "collision" may be used interchangeably with the term "contact".

The driving assistance apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assistance apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving assistance apparatus 50 illustrated in FIG. 2.

The invention claimed is:

1. A driving assistance apparatus configured to assist in driving of a vehicle, the driving assistance apparatus comprising:
   one or more processors; and
   one or more memories communicably coupled to the one or more processors, wherein the one or more processors are configured to execute:
      a blind spot region detection process of detecting a blind spot region as viewed from the vehicle formed by a blind spot forming object, based on data regarding a surrounding environment of the vehicle;
      a mobile body detection process of detecting a mobile body that has entered the blind spot region from outside the blind spot region, based on the data regarding the surrounding environment of the vehicle;
      a cumulative blind spot region calculation process of calculating a cumulative blind spot region in response to detection of the mobile body that has entered the blind spot region from outside the blind spot region, the cumulative blind spot region being a region that continues to be detected as the blind spot region from a time point at which an entry of the mobile body from outside the blind spot region into the blind spot region is detected;

a contact risk estimation process of estimating a risk of contact between the vehicle and the mobile body, based on a movement direction and a movement speed of the mobile body at the time point, and a temporal change in the cumulative blind spot region after the time point;

a driving condition setting process of setting a traveling path to reduce the risk of contact and setting a target steering angle and a target acceleration or deceleration rate based on the set traveling path; and a vehicle controlling process of controlling traveling of the vehicle based on the target steering angle and the target acceleration or deceleration rate, wherein the contact risk estimation process further includes:

estimating a course and a speed of the mobile body in the cumulative blind spot region, based on the movement direction and the movement speed of the mobile body at the time point and the temporal change in the cumulative blind spot region after the time point;

predicting an entry position and an entry speed at which the mobile body enters onto a path of the vehicle based on the course and the speed of the mobile body in the cumulative blind spot region; and estimating the risk of contact based on the predicted entry position and the entry speed of the mobile body.

2. The driving assistance apparatus according to claim 1, wherein, in the contact risk estimation process, the one or more processors are configured to predict the entry position and the entry speed, by identifying a range where the mobile body is likely to be present in the cumulative blind spot region, based on the temporal change in the cumulative blind spot region after the time point, and estimating the course and the speed of the mobile body in the cumulative blind spot region, based on the movement direction and the movement speed of the mobile body at the time point and the range where the mobile body is likely to be present.

3. A vehicle comprising the driving assistance apparatus according to claim 1.

4. A non-transitory computer readable recording medium containing a computer program to be applied to a driving assistance apparatus, the driving assistance apparatus being configured to assist in driving of a vehicle, the computer program causing, when executed by one or more processors, the one or more processors to implement a method, the method comprising:

detecting a blind spot region as viewed from the vehicle formed by a blind spot forming object, based on data regarding a surrounding environment of the vehicle;

detecting a mobile body that has entered the blind spot region from outside the blind spot region, based on the data regarding the surrounding environment of the vehicle;

calculating a cumulative blind spot region in response to detection of the mobile body that has entered the blind spot region from outside the blind spot region, the cumulative blind spot region being a region that continues to be detected as the blind spot region from a time point at which an entry of the mobile body from outside the blind spot region into the blind spot region is detected;

estimating a risk of contact between the vehicle and the mobile body, based on a movement direction and a movement speed of the mobile body at the time point, and a temporal change in the cumulative blind spot region after the time point;

setting a traveling path to reduce the risk of contact and setting a target steering angle and a target acceleration or deceleration rate based on the set traveling path; and controlling traveling of the vehicle based on the target steering angle and the target acceleration or deceleration rate, wherein estimating the risk of contact further includes:

estimating a course and a speed of the mobile body in the cumulative blind spot region, based on the movement direction and the movement speed of the mobile body at the time point and the temporal change in the cumulative blind spot region after the time point;

predicting an entry position and an entry speed at which the mobile body enters onto a path of the vehicle based on the course and the speed of the mobile body in the cumulative blind spot region; and estimating the risk of contact based on the predicted entry position and the entry speed of the mobile body.

5. The driving assistance apparatus according to claim 1, wherein, in the contact risk estimation process, the one or more processors are configured to:

identify a range where the mobile body is likely to be present in the cumulative blind spot region, based on the temporal change in the cumulative blind spot region after the time point;

determine a type of the mobile body; and estimate the course and the speed of the mobile body in the cumulative blind spot region, based on (i) a predetermined allowable acceleration or deceleration range associated with the determined type, (ii) the movement direction and the movement speed of the mobile body at the time point, and (iii) the range where the mobile body is likely to be present.

6. The driving assistance apparatus according to claim 1, wherein, in the contact risk estimation process, the one or more processors are configured to:

identify a range where the mobile body is likely to be present in the cumulative blind spot region, based on the temporal change in the cumulative blind spot region after the time point;

determine a type of the mobile body; and estimate the course and the speed of the mobile body in the cumulative blind spot region, based on (i) a predetermined allowable turning range associated with the determined type, (ii) the movement direction and the movement speed of the mobile body at the time point, and (iii) the range where the mobile body is likely to be present.

7. The driving assistance apparatus according to claim 1, wherein, in the contact risk estimation process, the one or more processors are configured to:

identify a range where the mobile body is likely to be present in the cumulative blind spot region, based on the temporal change in the cumulative blind spot region after the time point;

determine a type of the mobile body; and estimate the course and the speed of the mobile body in the cumulative blind spot region, based on (i) a predetermined allowable acceleration or deceleration range and a predetermined allowable turning range associated with the determined type, (ii) the movement direction and the movement speed of the mobile body at the time point, and (iii) the range where the mobile body is likely to be present.

8. The driving assistance apparatus according to claim 2, wherein, in the contact risk estimation process, the one or more processors are configured to identify the range where the mobile body is likely to be present in the cumulative blind spot region, based on a size of the mobile body and the temporal change in the cumulative blind spot region after the time point.

9. The driving assistance apparatus according to claim 5, wherein, in the contact risk estimation process, the one or more processors are configured to identify the range where the mobile body is likely to be present in the cumulative blind spot region, based on a size of the mobile body and the temporal change in the cumulative blind spot region after the time point.

10. The driving assistance apparatus according to claim 6, wherein, in the contact risk estimation process, the one or more processors are configured to identify the range where the mobile body is likely to be present in the cumulative blind spot region, based on a size of the mobile body and the temporal change in the cumulative blind spot region after the time point.

11. The driving assistance apparatus according to claim 7, wherein, in the contact risk estimation process, the one or more processors are configured to identify the range where the mobile body is likely to be present in the cumulative blind spot region, based on a size of the mobile body and the temporal change in the cumulative blind spot region after the time point.

* * * * *